US011124645B2

(12) United States Patent
Ushiyama et al.

(10) Patent No.: US 11,124,645 B2
(45) Date of Patent: Sep. 21, 2021

(54) CURABLE RESIN COMPOSITION, AND FILM, MOLDED ARTICLE, PREPREG, AND FIBER-REINFORCED PLASTIC USING SAID CURABLE RESIN COMPOSITION

(71) Applicant: Mitsubishi Chemical Corporation, Chiyoda-ku (JP)

(72) Inventors: Hisaya Ushiyama, Tokyo (JP); Nao Deguchi, Tokyo (JP); Kenichi Watanabe, Tokyo (JP); Juichi Fujimoto, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 122 days.

(21) Appl. No.: 16/447,428

(22) Filed: Jun. 20, 2019

(65) Prior Publication Data
US 2019/0330464 A1    Oct. 31, 2019

Related U.S. Application Data

(63) Continuation of application No. PCT/JP2017/045922, filed on Dec. 21, 2017.

(30) Foreign Application Priority Data

Dec. 21, 2016  (JP) .............................. JP2016-247300
Aug. 22, 2017  (JP) .............................. JP2017-159015

(51) Int. Cl.
| | | |
|---|---|---|
| *C08J 5/24* | (2006.01) | |
| *B32B 27/38* | (2006.01) | |
| *C08L 63/00* | (2006.01) | |
| *C08G 59/24* | (2006.01) | |
| *C08G 59/40* | (2006.01) | |
| *C08G 59/50* | (2006.01) | |
| *C08J 5/18* | (2006.01) | |
| *C08L 33/24* | (2006.01) | |

(52) U.S. Cl.
CPC ............ *C08L 63/00* (2013.01); *C08G 59/245* (2013.01); *C08G 59/4021* (2013.01); *C08G 59/5033* (2013.01); *C08G 59/5046* (2013.01); *C08J 5/18* (2013.01); *C08J 5/24* (2013.01); *C08L 33/24* (2013.01)

(58) Field of Classification Search
CPC ......... B32B 1/08; B32B 27/38; C08G 59/226; C08L 63/00; C09D 163/00; C09J 163/00; C08J 5/24
USPC ................................................ 428/297.4, 413
See application file for complete search history.

(56) References Cited

U.S. PATENT DOCUMENTS

| | | | | |
|---|---|---|---|---|
| 4,374,963 A | * | 2/1983 | Morgan ................. | C08F 283/10 427/386 |
| 4,581,436 A | * | 4/1986 | Corley ................... | C08F 283/10 525/502 |
| 4,666,954 A | * | 5/1987 | Forgo .................... | C08G 59/50 156/273.3 |
| 4,755,571 A | * | 7/1988 | Irving .................... | C08G 59/66 525/532 |
| 4,874,833 A | * | 10/1989 | Kershaw ............... | C08F 283/10 528/90 |
| 5,098,496 A | * | 3/1992 | Breitigam ............. | B29C 70/521 156/180 |
| 6,670,006 B1 | | 12/2003 | Sugimori et al. | |
| 2012/0252930 A1 | * | 10/2012 | Kobayashi ............. | C08L 63/00 523/400 |
| 2013/0217805 A1 | * | 8/2013 | Hayashi ................. | C08L 63/00 523/427 |
| 2015/0252160 A1 | * | 9/2015 | Teranishi ............. | C09D 163/00 428/413 |
| 2015/0322257 A1 | | 11/2015 | Hirano | |
| 2017/0282516 A1 | | 10/2017 | Teranishi et al. | |
| 2017/0291985 A1 | | 10/2017 | Takaiwa et al. | |
| 2017/0369700 A1 | | 12/2017 | Mitobe et al. | |

FOREIGN PATENT DOCUMENTS

| | | |
|---|---|---|
| JP | 62-187722 A | 8/1987 |
| JP | 04-130141 | 5/1992 |
| JP | 10-290851 A | 11/1998 |
| JP | 11-43547 A | 2/1999 |
| JP | 2000-509743 A | 8/2000 |
| JP | 2002-194057 A | 7/2002 |
| JP | 3669090 B2 | 4/2005 |
| JP | 2011-2021343 A | 10/2011 |
| JP | 5424021 B2 | 12/2013 |
| JP | 2016-69563 A | 5/2016 |
| WO | WO 97/42549 A1 | 11/1997 |
| WO | WO 98/44017 A1 | 10/1998 |
| WO | WO 2007/032326 A1 | 3/2007 |

(Continued)

OTHER PUBLICATIONS

International Search Report dated Mar. 27, 2018 in PCT/JP2017/045922, citing documents AF-AS therein, 7 pages (with English translation).
Office Action dated Mar. 19, 2019 in Japanese Patent Application No. 2018-502827, citing documents AF-AH and AJ-AS therein, 19 pages (with unedited computer generated English translation obtained from the Global Dossier on May 10, 2019).
Oyama, T. "Toughening of Epoxy and Other Thermosetting Resins by in situ Generation of Modifier Polymers" Network Polymer, vol. 36, No. 5, 2015, 24 pages (with partial English translation).
Office Action as received in the corresponding JP patent application No. 2019-211788, dated Jun. 22, 2021 w/computer generated English translation, 9 pages.

*Primary Examiner* — Michael J Feely
(74) *Attorney, Agent, or Firm* — Oblon, McClelland, Maier & Neustadt, L.L.P.

(57) ABSTRACT

A curable resin composition including components (A), (B), (C) and (D) below: component (A): a bisphenol epoxy resin with a softening point of 80° C. or more, component (B): a bisphenol epoxy resin which is liquid at 25° C., component (C): a bi- or more-functional (meth)acrylate compound, and component (D): a curing agent.

14 Claims, No Drawings

(56) References Cited

FOREIGN PATENT DOCUMENTS

| WO | WO 2014/007288 A1 | 1/2014 |
| WO | WO 2016/035459 A1 | 3/2016 |
| WO | WO 2016/060166 A1 | 4/2016 |
| WO | WO 2016/104314 A1 | 6/2016 |
| WO | WO 2016/121395 A1 | 8/2016 |

* cited by examiner

CURABLE RESIN COMPOSITION, AND FILM, MOLDED ARTICLE, PREPREG, AND FIBER-REINFORCED PLASTIC USING SAID CURABLE RESIN COMPOSITION

TECHNICAL FIELD

The present invention relates to a curable resin composition, and a film, a molded article, a prepreg and a fiber-reinforced plastic using the same, which are suitably used for sports and leisure applications, general industrial applications, aircraft materials applications, and the like.

This application is a continuation application of International Application No. PCT/JP2017/045922, filed on Dec. 21, 2017, which claims the benefit of priority of the prior Japanese Patent Application No. 2016-247300, filed on Dec. 21, 2016, and the prior Japanese Patent Application No. 2017-159015, filed on Aug. 22, 2017, the entire contents of which are incorporated herein by reference.

BACKGROUND ART

A fiber-reinforced plastic, which is one of fiber-reinforced composite materials, is used in wide variety of fields ranging from sports and leisure applications to industrial applications such as automobiles and aircrafts because of its light weight, high strength and high rigidity.

A fiber-reinforced plastic is produced, for example, by a method using an intermediate material, namely a prepreg in which a reinforcing material formed of long fibers (continuous fibers) such as reinforcing fibers, is impregnated with a matrix resin. This method has advantages that the amount of the reinforcing fibers in the fiber-reinforced plastic can be easily controlled, and a larger amount of the reinforcing fibers can be incorporated into the plastic. This method also allows the production of a molded article by laminating a plurality of prepregs and heat-curing the laminated prepregs.

In many cases, carbon fibers excellent in specific strength and specific elastic modulus are used as reinforcing fibers for meeting the needs for weight reduction, and epoxy resins excellent in adhesiveness with carbon fibers are used as a matrix resin.

However, since epoxy resins generally tend to become brittle when cured and have low toughness, there are technical problems that improvements in fracture toughness and rigidity of fiber-reinforced plastics are required. Therefore, in recent years, it has been studied to improve toughness by adding a modifier such as a block copolymer to utilize the phase separation structure generated in the curing process of the resin; however, the Tg and elastic modulus tend to decline in this modified system.

Moreover, although the toughening of the epoxy resins has conventionally been performed by the modification methods using engineering plastics such as a polyether sulfone, a significant increase in viscosity is inevitable.

In order to solve this problem, it has been attempted to simultaneously form a modifier and cure the matrix resin by polymerizing the monomer which is the source of the modifier in the system by the "in situ polymerization method". (Non-Patent Document 1)

In this attempt, a vinyl polymer generated by radical polymerization is used as a modifier. Also in the field of fiber-reinforced plastics, technological development is under way to produce an intermediate material by using an epoxy resin and a radical polymerization in combination (Patent Documents 1, 2 and 3).

PRIOR ART REFERENCES

Non-Patent Document

Non-Patent Document 1: Oyama Toshiyuki, Network Polymer, 36, 211 (2015)

Patent Document

Patent Document 1: Japanese Patent Granted Publication No. 3669090
Patent Document 2: Japanese Unexamined Patent Application, First Publication No. Hei 11-43547
Patent Document 3: Japanese Patent Granted Publication No. 5424021

DISCLOSURE OF INVENTION

Problems to be Solved by the Invention

However, in none of the prior art documents, sufficient studies are made with respect to resins for a prepreg useful for forming a high strength and high toughness fiber-reinforced plastic. In the composition of each of Non-Patent Document 1 and Patent Document 3, the viscosity of the composition is too low for use as a prepreg. The use of the composition was difficult, and the bending strength was not sufficient. Although Patent Documents 1 and 2 recite examples using various epoxy resin compositions as a matrix resin for a prepreg, the inventions of these patent documents relate to prepreg production methods using the radical polymerization as a viscosity increasing means, and the fiber-reinforced plastics formed using the prepregs obtained by the above methods also have insufficient bending strength.

The present invention has been made in view of the above background, and made based on a finding that the use of a specific epoxy resin and a radical polymerizable monomer as a matrix resin enables the formation of a resin cured product that excels in all of strength, elastic modulus and toughness, and the production of a fiber-reinforced plastic having excellent mechanical properties. The present invention provides a curable resin composition capable of showing excellent fracture strength especially when applied to a tubular composite material, a prepreg using the resin composition, and a fiber-reinforced plastic formed using the prepreg.

Means to Solve the Problems

As a result of intensive studies, the present inventors have found that the use of an epoxy resin having a specific structure and a radically polymerizable monomer having a specific structure can solve the above problems, and enables the production of a fiber-reinforced plastic with desired performance.

That is, the present invention is as follows.

[1] A curable resin composition including components (A), (B), (C) and (D) below:
    component (A): a bisphenol epoxy resin with a softening point of 80° C. or more,
    component (B): a bisphenol epoxy resin which is liquid at 25° C.,
    component (C): a bi- or more-functional (meth)acrylate compound, and
    component (D): a curing agent.

[2] The curable resin composition according to [1], which further includes component (H): an oxazolidone ring-containing epoxy resin.

[3] The curable resin composition according to [1] or [2], wherein the component (D) includes at least one component (d1) selected from the group consisting of dicyandiamide, ureas, imidazoles, and aromatic amines, and at least one component (d2) which is a radical polymerization initiator.

[4] The curable resin composition according to [3], wherein the component (d1) is contained in an amount of 1 to 15 parts by mass with respect to 100 parts by mass of total of all epoxy resins contained in the curable resin composition.

[5] The curable resin composition according to [3], wherein the component (d2) is contained in an amount of 0.1 to 5 parts by mass with respect to 100 parts by mass of total of all epoxy resins and all (meth)acrylate compounds contained in the curable resin composition.

[6] The curable resin composition according to any one of [1] to [5], wherein the component (A) is contained in an amount of 20 parts by mass or more and 80 parts by mass or less with respect to 100 parts by mass of total of all epoxy resins contained in the curable resin composition.

[7] The curable resin composition according to any one of [1] to [6], wherein the component (B) is contained in an amount of 20 parts by mass or more and 80 parts by mass or less with respect to 100 parts by mass of total of all epoxy resins contained in the curable resin composition.

[8] The curable resin composition according to any one of [1] to [7], wherein the component (C) is contained in an amount of 5 to 45 parts by mass with respect to 100 parts by mass of total of all epoxy resins contained in the curable resin composition.

[9] The curable resin composition according to any one of [1] to [8], which further includes component (E): a thermoplastic resin.

[10] The curable resin composition according to [9], wherein the component (E) is contained in an amount of 1 part by mass or more and 15 parts by mass or less with respect to 100 parts by mass of total of all epoxy resins contained in the curable resin composition.

[11] A film formed from the curable resin composition according to any one of [1] to [10].

[12] A molded article formed from the curable resin composition according to any one of [1] to [10].

[13] A prepreg including a mass of reinforcing fibers impregnated with the curable resin composition of any one of [1] to [10].

[14] A prepreg including reinforcing fibers and a matrix resin, wherein the matrix resin is a curable resin composition comprising components (A), (B), (C) and (D) below:
component (A): a bisphenol epoxy resin with a softening point of 80° C. or more,
component (B): a bisphenol epoxy resin which is liquid at 25° C.,
component (C): a bi- or more-functional (meth)acrylate compound, and
component (D): a curing agent.

[15] The prepreg according to [14], which further includes component (H): an oxazolidone ring-containing epoxy resin.

[16] The prepreg according to any one of [13] to [15], which is a unidirectional prepreg including unidirectionally aligned reinforcing fibers impregnated with the resin composition, wherein the prepreg has a flexural strength of 1750 MPa or more, a flexural modulus of 125 GPa or more, and an elongation at break of 1.2% or more, each measured with respect to a fiber-reinforced plastic plate produced using the prepreg by a method including cutting the prepreg in an uncured state into 24 sheets each having a size of 300 mm×300 mm, stacking the 24 sheets such that fiber directions of the sheets are the same to obtain a laminate, heating the laminate in an autoclave at a heating rate of 2° C./min under a pressure of 0.04 MPa, holding the laminate in the autoclave at 80° C. for 60 minutes, heating the laminate in the autoclave at a heating rate of 2° C./min under a pressure of 0.6 MPa, and holding the laminate in the autoclave at 130° C. for 90 minutes, thereby heat-curing the laminate to obtain a fiber-reinforced plastic plate having a thickness of 2.1 mm.

[17] A fiber-reinforced plastic comprising a cured product of the curable resin composition according to any one of [1] to [10] and reinforcing fibers.

[18] The fiber-reinforced plastic according to [17], which is tubular.

[19] A fiber-reinforced plastic molded article including: a matrix resin including a bisphenol epoxy resin and a (meth)acrylate which together form a sea-island structure; and reinforcing fibers, wherein the fiber-reinforced plastic molded article has a flexural strength of 1800 MPa or more, a flexural modulus of 65 GPa or more, and an elongation at break of 8% or more.

Effect of the Invention

The curable resin composition of the present invention can provide a cured resin with high strength, high elastic modulus and high toughness, and the use of the curable resin composition of the present invention as a matrix resin of a fiber-reinforced plastic enables the production of a fiber-reinforced plastic with excellent mechanical properties. Especially, the use of the curable resin composition of the present invention enables the production of a fiber-reinforced plastic tube having excellent fracture strength.

DESCRIPTION OF THE EMBODIMENTS

Hereinbelow, the present invention will be described in detail.

In the present invention, the term "epoxy resin" means a compound having two or more epoxy groups in one molecule, and the term "bi- or more-functional (meth)acrylate compound" means an acrylate compound (acrylic ester) and/or a methacrylate compound (methacrylic ester), each having two or more double bonds in one molecule.

In addition, the term "curable resin composition" means a resin composition containing an epoxy resin, a (meth)acrylate compound, a curing agent, a curing accelerator, and optionally a thermoplastic resin, an additive, etc.

Further, in the present invention, a cured product obtained by curing the curable resin composition is referred to as a "cured resin product", and a plate-shaped cured product may particularly be referred to as a "resin plate".

In the present invention, the softening point, epoxy equivalent and active hydrogen equivalent are values measured under the following conditions.

1) Softening point: value measured in accordance with JIS-K7234: 2008 (ring and ball method).

2) Epoxy equivalent: value measured in accordance with JIS K-7236: 2001.

[Curable Resin Composition]

The curable resin composition of the present invention (hereinafter also referred to as "present resin composition") includes component (A), component (B), component (C) and component (D). The present resin composition may further include optional components, such as component (H), component (E), component (F), component (G), and an additive.

<Component (A)>

The component (A) is a bisphenol epoxy resin having a softening point of 80° C. or more, preferably 82 to 150° C., more preferably 85 to 145° C. When the softening point of the component (A) is not less than the above lower limit value, a cured resin product obtainable from the present resin composition has excellent toughness. On the other hand, when the softening point of the component (A) is not more than the above upper limit, it becomes likely that the heat resistance of the cured resin product can be properly maintained, and a prepreg excellent in tack and drape (conformability to mold shape (flexibility)) as well as a fiber-reinforced composite material free of voids can be obtained.

The present resin composition preferably contains the component (A) in an amount of 20 parts by mass or more and 80 parts by mass or less, more preferably 25 parts by mass or more and 75 parts by mass or less, and still more preferably 30 parts by mass or more and 70 parts by mass or less, relative to 100 parts by mass of total of all epoxy resins contained in the resin composition. In the present specification, the total of all epoxy resins means a total of the epoxy resins as the component (A) and the component (B), or a total of the epoxy resins as a component (F) and/or a component (H) to be described later as well as the component (A) and the component (B), when the resin composition further contains the component (F) and/or the component (H).

The lower limit of the amount of the component (A) is preferably 25 parts by mass or more, and more preferably 30 parts by mass or more. The upper limit of the amount of the component (A) is preferably 75 parts by mass or less, and more preferably 70 parts by mass or less.

When the amount of the component (A) in the present resin composition is 20 parts by mass or more, a cured resin product excellent in toughness tends to be obtained. On the other hand, when the amount of the component (A) is 80 parts by mass or less, it becomes likely that the heat resistance of the cured resin product can be properly maintained, and a prepreg excellent in tack and drape (conformability to mold shape (flexibility)) as well as a fiber-reinforced composite material free of voids can be obtained.

The component (A) may be a commercially available product.

Non-limiting examples of the commercially available bisphenol A epoxy resins (component (A)) having a softening point of 80° C. or more include jER1055, jER1004, jER1007 and jER1009 (each being a product name of product manufactured by Mitsubishi Chemical Corporation); EPICLON 2050, EPICLON 3050, EPICLON 4050, EPICLON 7050, EPICLON HM-091 and EPICLON HM-101 (each being a product name of a product manufactured by DIC Corporation); YD-902, YD-903N, YD-904, YD-907, YD-7910 and YD-6020 (each being a product name of a product manufactured by Nippon Steel & Sumikin Chemical Co., Ltd.); and the like.

Non-limiting examples of the commercially available bisphenol F epoxy resin (component (A)) having a softening point of 80° C. or more include jER4004P, jER4005P, jER4007P and jER4010P (each being a product name of a product manufactured by Mitsubishi Chemical Corporation); YDF2004 and YDF-2005RD (each being a product name of a product manufactured by Nippon Steel & Sumikin Chemical Co., Ltd.); and the like.

As the component (A), any of the above-mentioned epoxy resins can be preferably used in the present invention, and one of these may be used alone, or two or more may be used in combination.

<Component (B)>

The component (B) is a bisphenol epoxy resin which is liquid at 25° C. The component (B) primarily contributes to the improvement of the strength, elastic modulus and heat resistance of the cured resin product obtainable from the present resin composition. The term "liquid" above indicates that the bisphenol epoxy resin has fluidity. The viscosity of the epoxy resin is preferably 500 Pa·s or less, more preferably 0.1 to 300 Pa·s, at 25° C. When the viscosity is in this range, the workability of the present resin composition can be improved.

The present resin composition preferably contains the component (B) in an amount of 20 mass parts or more and 80 mass parts or less with respect to 100 mass parts of total of all epoxy resins contained in the present resin composition.

The lower limit of the amount of the component (B) is more preferably 25 parts by mass or more, still more preferably 30 parts by mass or more. The upper limit of the amount of the component (B) is more preferably 75 parts by mass or less, still more preferably 70 parts by mass or less.

When the amount of the component (B) is 20 parts by mass or more in the present resin composition, a cured resin product excellent in strength and elastic modulus is likely to be obtained. On the other hand, when the amount of the component (B) is 80 parts by mass or less, a cured resin product excellent in toughness is likely to be obtained.

The component (B) may be a commercially available product.

Non-limiting examples of the commercially available bisphenol A epoxy resins (component (B)) which are liquid at 25° C. include jER 827 (epoxy equivalent 185 g/eq) and jER 828 (epoxy equivalent 189 g/eq) (each manufactured by Mitsubishi Chemical Corporation); YD-127 (epoxy equivalent 185 g/eq) and YD-128 (epoxy equivalent 189 g/eq) (each manufactured by Nippon Steel & Sumikin Chemical Co., Ltd.); EPICLON 840 (epoxy equivalent 185 g/eq) and EPICLON 850 (epoxy equivalent 189 g/eq) (each manufactured by DIC Corporation); D.E.R331 (epoxy equivalent 187 g/eq) and D.E.R332 (epoxy equivalent 173 g/eq) (each manufactured by THE DOW CHEMICAL COMPANY); and the like.

Non-limiting examples of the commercially available bisphenol F epoxy resin (component (B)) having an epoxy equivalent of 250 or less include jER 806 (epoxy equivalent 165 g/eq) and jER 807 (epoxy equivalent 170 g/eq) (each manufactured by Mitsubishi Chemical Corporation); YDF-170 (epoxy equivalent 170 g/eq) (manufactured by Nippon Steel & Sumikin Chemical Co., Ltd.); EPICLON 830 (epoxy equivalent 170 g/eq) and EPICLON 835 (epoxy equivalent 172 g/eq) (each manufactured by DIC Corporation); D.E.R354 (epoxy equivalent 170 g/eq) (manufactured by THE DOW CHEMICAL COMPANY); and the like. One of these may be used alone, or two or more may be used in combination.

<Component (C)>

The component (C) is a bi- or more-functional (meth)acrylate compound. The component (C) contributes to the improvement of the strength, elastic modulus, and toughness of the cured resin product obtainable from the present resin composition.

Examples of the bi-functional (meth)acrylate compounds include diols such as ethylene glycol, diethylene glycol, triethylene glycol, tetraethylene glycol, propylene glycol, dipropylene glycol, tripropylene glycol, tetrapropylene glycol, 1,3-butylene glycol, 1,4-butanediol, 1,5-pentanediol, neopentyl glycol, 3-methyl-1,5-pentanediol, 2,4-diethyl-1, 5-pentanediol, 1,6-hexanediol, 1,9-nonanediol, 2-methyl-1, 8-octanediol, 1,10-decanediol, neopentyl glycol hydroxypivalate, tricyclodecanedimethanol, cyclohexanedimethanol, bisphenol A, hydrogenated bisphenol A, dioxane glycol, and bisphenoxyfluorene ethanol; and di(meth)acrylates obtained by esterification reaction of diols (obtained by adding ethylene oxide, propylene oxide or caprolactone to any of the above-exemplified diols) with (meth)acrylic acid.

Examples of the tri-functional (meth)acrylate compound include tri(meth)acrylates obtained by esterifying an alcohol obtained by adding ethylene oxide, propylene oxide, caprolactone or the like to triol or tetraol such as trimethylolpropane, tris(2-hydroxyethyl) isocyanurate, glycerol, pentaerythritol, and the like.

Examples of tetra- or more-functional (meth)acrylate compound include poly(meth)acrylates obtained by esterifying a polyol by reaction thereof with (meth)acrylic acid. Examples of the polyol include ditrimethylolpropane, pentaerythritol, dipentaerythritol, tripentaerythritol, and a polyol obtained by adding ethylene oxide, propylene oxide or caprolactone to any of the above-exemplified polyols.

Further examples include urethane poly(meth)acrylates obtained by directly adding hydroxyethyl (meth)acrylate, hydroxypropyl (meth)acrylate, pentaerythritol triacrylate or the like to at least one kind of polyisocyanates, such as 1,3- and 1,4-diisocyanatocyclohexanes, 3-isocyanatomethyl-3,5, 5-trimethylcyclohexyl isocyanate, 4,4'-methylenedicyclohexyl diisocyanate, 2,4-methylenedicyclohexyl diisocyanate, 2,2'-methylenedicyclohexyl diisocyanate, tolylene diisocyanate, diphenylmethane diisocyanate, and hexamethylene diisocyanate.

These can be used individually or in combination of two or more thereof.

The present resin composition preferably contains the component (C) in an amount of 5 mass parts or more and 45 mass parts or less with respect to 100 mass parts of total of all epoxy resins contained in the present resin composition.

The lower limit of the amount of the component (C) is more preferably 10 parts by mass or more. The upper limit of the amount of the component (B) is more preferably 40 parts by mass or less.

When the amount of the component (C) is 5 parts by mass or more in the present resin composition, a cured resin product excellent in strength and elastic modulus is likely to be obtained. On the other hand, when the amount of the component (C) is 45 parts by mass or less, a cured resin product excellent in dimensional stability is likely to be obtained.

<Component (D)>

The component (D) is a curing agent. The curing agent used as the component (D) is not particularly limited, but it is preferable to use, in combination, a component (d1) for curing the components (A) and (B), and a component (d2) for curing the component (C). As the component (d1), dicyandiamide, ureas, imidazoles, aromatic amines, other amine-based curing agents, acid anhydrides, boron chloride amine complex, etc. can be used, but in particular it is preferable to use at least one curing agent selected from dicyandiamide, ureas, imidazoles and aromatic amines.

Dicyandiamide is preferable because it has a high melting point and suppresses the compatibility with the epoxy resin in a low temperature range, so that a curable resin composition having excellent pot life is likely to be obtained as a result of the use thereof as the curing agent (d1). Further, the use of dicyandiamide as the curing agent (d1) is preferable also in that the presence of dicyandiamide as the curing agent (d1) in the curable resin composition tends to improve the mechanical properties of the cured resin product.

With respect to the amount of dicyandiamide in the curable resin composition of the present invention, the amount is preferably such that the number of moles of active hydrogen of dicyandiamide is preferably 0.4 to 1 times the total number of moles of epoxy groups possessed by the epoxy resins contained in the curable resin composition. When it is 0.4 times or more, a cured product having good heat resistance and good mechanical properties (that is, high strength and elastic modulus) tends to be obtained. Further, with this number being 1 times or less, there is an advantage that a cured product having good mechanical properties (that is, excellent plastic deformation capacity and impact resistance) tends to be obtained. Furthermore, this number of moles of active hydrogen of dicyandiamide is more preferably 0.5 to 0.8 times since the cured resin product tends to excel more in heat resistance.

Non-limiting examples of commercially available products of dicyandiamide include DICY7 and DICY15 (each manufactured by Mitsubishi Chemical Corporation); DICYANEX1400F (manufactured by Air Products and Chemicals Inc.); and the like.

With respect to the urea usable as the component (d1), there is no particular limitation as long as it has a dimethylureido group in its molecule, and generates an isocyanate group and dimethylamine when heated at high temperature, which activate epoxy groups of the component (A) and the component (B) or other epoxy resins to be used in combination. Examples of the ureas include an aromatic dimethylurea having a dimethylureido group bonded to its aromatic ring, and an aliphatic dimethyl urea having a dimethylureido group bonded to an aliphatic compound. Among these, an aromatic dimethyl urea is preferable in that the curing speed is increased and the heat resistance and flexural strength of the cured product tend to improve.

As the aromatic dimethyl urea, for example, phenyldimethylurea, methylene bis(phenyldimethylurea), and tolylene bis(dimethylurea) can be suitably used. Specific examples thereof include 4,4'-methylenebis (phenyldimethylurea) (MBPDMU), 3-phenyl-1,1-dimethylurea (PDMU), 3-(3,4-dichlorophenyl)-1,1-dimethylurea (DCMU), 3-(3-chloro-4-methylphenyl)-1,1-dimethylurea, 2,4-bis(3,3-dimethylureido) toluene (TBDMU), and dimethylurea obtained from m-xylylene diisocyanate and dimethylamine. Among these, DCMU, MBPDMU, TBDMU, and PDMU are more preferable in terms of the abilities to accelerate curing and impart heat resistance to a cured resin product.

One of these may be used alone, or two or more of these may be used in combination.

Examples of the aliphatic dimethylurea include dimethylurea obtained from isophorone diisocyanate and dimethylamine, and dimethylurea obtained from hexamethylene diisocyanate and dimethylamine.

The ureas may be commercially available products.

Non-limiting examples of the commercial products of DCMU include DCMU-99 (manufactured by Hodogaya Chemical Industry Co., Ltd.) and the like.

Non-limiting examples of the commercial products of MBPDMU include Technicure MDU-11 (manufactured by A & C Catalysts Inc.), Omicure 52 (manufactured by PTI Japan, Ltd.) and the like.

Non-limiting examples of the commercial products of PDMU include Omicure 94 (manufactured by PTI Japan, Ltd.) and the like.

Non-limiting examples of the commercial products of TBDMU include Omicure 24 (manufactured by PTI Japan, Ltd.), U-CAT 3512T (manufactured by San-Apro Ltd.) and the like.

Non-limiting examples of the commercial products of aliphatic dimethylurea include U-CAT 3513N (manufactured by San-Apro Ltd.) and the like.

The amount of the urea is preferably 1 to 15 parts by mass, more preferably 2 to 10 parts by mass, with respect to 100 parts by mass of total of all epoxy resins contained in the curable resin composition of the present invention. When the amount of the ureas is 1 part by mass or more, the urea sufficiently cures and accelerates the curing of the epoxy resins contained in the epoxy resin composition, whereby mechanical properties and heat resistance are likely to improve. On the other hand, when the amount of the urea is 15 parts by mass or less, the toughness of the cured resin product is likely to be maintained high.

The imidazoles usable as the component (d1) may be imidazoles, or may be imidazole adducts, imidazole clathrates, microencapsulated imidazoles or imidazole compounds stabilized by coordination with a stabilizer.

Each of these compounds has a nitrogen atom having an unshared electron pair in its structure, which can activate the epoxy groups of the component (A) or the component (B), or also activate the other epoxy resins to be used, to thereby accelerate the curing.

Non-limiting specific examples of the imidazole include 2-methylimidazole, 2-ethyl-4-methylimidazole, 2-undecylimidazole, 2-heptadecylimidazole, 1,2-dimethylimidazole, 2-phenylimidazole and 2-phenyl-4-methylimidazole, 1-benzyl-2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-ethyl-4-methylimidazolium trimellitate, 1-cyanoethyl-2-undecylimidazolium trimellitate, 1-cyanoethyl-2-phenylimidazolium trimellitate, 2,4-diamino-6-(2'-methylimidazolyl-(1'))-ethyl-s-triazine, 2,4-diamino-6-(2'-undecylimidazolyl-(1'))-ethyl-s-triazine, 2,4-diamino-6-(2'-ethyl-4-methylimidazolyl-(1'))-ethyl-s-triazine, 2,4-diamino-6-(2'-methylimidazolyl-(1'))-ethyl-s-triazine-isocyanuric acid adduct, 2-phenylimidazole-isocyanuric acid adduct, 2-methylimidazole-isocyanuric acid adduct, 1-cyanoethyl-2-phenyl-4,5-di(2-cyanoethoxy) methylimidazole, 2-phenyl-4,5-dihydroxymethylimidazole, 2-phenyl-4-methyl-5-hydroxymethyl imidazole, and the like.

The imidazole adducts, imidazole clathrates including other molecules, microencapsulated imidazoles and imidazole compounds coordinated with a stabilizer are modified products of the imidazole described above. The adduct treatment, clathration with other molecules, microencapsulation and coordination with a stabilizer can decrease the activity of the imidazole, which allows the curable resin composition to exhibit excellent pot life in a low temperature range while exhibiting high capability of curing or cure acceleration.

The imidazoles may be commercially available products. Non-limiting examples of the commercial products of imidazole include 2E4MZ, 2P4MZ, 2PZ-CN, C11Z-CNS, C11Z-A, 2MZA-PW, 2MA-OK, 2P4MHZ-PW and 2PHZ-PW (each manufactured by Shikoku Chemicals Corporation).

Non-limiting examples of the commercial products of imidazole adducts include PN-50, PN-50J, PN-40, PN-40J, PN-31, PN-23 and PN-H, all of which have a structure formed by ring-opening addition of an imidazole compound to epoxy groups of an epoxy resin (each manufactured by Ajinomoto Fine-Techno Co., Inc.). Non-limiting examples of the commercial products of imidazole clathrates include T1C-188, KM-188, HIPA-2P4MHZ, NIPA-2P4MHZ, TEP-2E4MZ, HIPA-2E4MZ and NIPA-2E4MZ (each manufactured by Nippon Soda Co., Ltd.).

Non-limiting examples of the commercial products of microencapsulated imidazoles include Novacure HX3721, HX3722, HX3742 and HX3748 (each manufactured by Asahi Kasei E-materials Corp.); and LC-80 (manufactured by A & C Catalysts Inc.).

As for the imidazole compounds coordinated with a stabilizer, for example, such compounds can be prepared by combining Cureduct P-0505 (bisphenol A diglycidyl ether/ 2-ethyl-4-methyl imidazole adduct), which is an imidazole adduct manufactured by Shikoku Chemicals Corporation, with L-07N (epoxy-phenol-borate blend), which is a stabilizer manufactured by Shikoku Chemicals Corporation. Similar effects can be obtained by using the aforementioned various imidazoles and imidazole compounds such as imidazole adducts instead of the aforementioned Cureduct P-0505. As an imidazole compound before being coordinated with a stabilizer, any of those showing low solubility with respect to an epoxy resin can be suitably used, and Cureduct P-0505 is preferable from this point of view.

The amount of the imidazole is preferably 1 to 15 parts by mass, more preferably 2 to 10 parts by mass, with respect to 100 parts by mass of total of all epoxy resins contained in the curable resin composition of the present invention. When the amount of the imidazole is 1 part by mass or more, the imidazole is likely to sufficiently cure and accelerate the curing of the epoxy resins contained in the epoxy resin composition, and a sufficiently high heat resistance is likely to be achieved. On the other hand, when the amount of the imidazole is 15 parts by mass or less, a cured resin product having excellent mechanical properties is likely to be obtained.

Non-limiting examples of the aromatic amines usable as the component (d1) include 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5 '-diethyl-4, 4'-diaminodiphenylmethane, 3,3'-di-t-butyl-5,5'-diethyl-4, 4'-diaminodiphenylmethane, 3,3' 5,5'-tetraisopropyl-4,4'-diaminodiphenylmethane, 3,3'-di-t-butyl-5,5'-diisopropyl-4, 4'-diaminodiphenylmethane, 3,3'5,5'-tetra-t-butyl-4,4'-diaminodiphenylmethane, 4,4'-diaminodiphenylmethane, 4,4'-diaminodiphenylsulfone, 3,3'-diaminodiphenylsulfone, m-phenylenediamine, m-xylylenediamine, diethyltoluenediamine and the like. Among these, it is preferable to use 4,4'-diaminodiphenylsulfone and 3,3'-diaminodiphenylsulfone because these are excellent in heat resistance and elastic modulus and can provide a cured product which has a small linear expansion coefficient and suffers less reduction of heat resistance due to moisture absorption. 4,4'-diaminodiphenylsulfone is also preferable in that the tack life of the prepreg can be maintained for a long period of time. 3,3'-diaminodiphenylsulfone is inferior to 4,4'-diaminodiphenylsulfone in the tack life of the prepreg and the heat resistance of the cured product; nevertheless, 3,3'- diaminodiphenylsulfone is preferable because it can increase the elastic modulus and toughness of the cured product. Further, it is preferable to blend 4,4'-diaminodiphenylsulfone together with 3,3'-diaminodiphenylsulfone because the heat resistance and elastic modulus of the cured product can be easily adjusted. These aromatic amines may be used alone or in combination as appropriate.

As for the blending amount of the aromatic amines, especially in the case of diaminodiphenylsulfone, the active hydrogen equivalent number of the amino group is preferably 0.5 to 1.5 times, more preferably 0.6 to 1.4 times the epoxy equivalent number of all epoxy resins contained in the curable resin composition of the present invention. By blending such epoxy resin curing agents in an amount of 0.5 to 1.5 times, the elastic modulus, toughness and heat resistance of the cured resin product are likely to fall within favorable ranges.

The aromatic amines may be commercially available products.

Non-limiting examples of commercial products of 4,4'-diaminodiphenyl sulfone include Seikacure S (active hydrogen equivalent 62 g/eq, manufactured by Wakayama Seika Kogyo Co., Ltd.), and Sumicure S (active hydrogen equivalent 62 g/eq, manufactured by Sumitomo Chemical Co., Ltd.). Non-limiting examples of commercial products of 3,3'-diaminodiphenyl sulfone include 3,3'-DAS (active hydrogen equivalent 62 g/eq, manufactured by Mitsui Fine Chemicals, Inc.).

Non-limiting examples of other commercial products of the aromatic amines include MDA-220 (active hydrogen equivalent 50 g/eq, manufactured by Mitsui Chemicals Inc.); "jER Cure (registered trademark)" W (active hydrogen equivalent 45 g/eq, Japan Epoxy Resin Co., Ltd.); and "Lonzacure (registered trademark)" M-DEA (active hydrogen equivalent 78 g/eq), "Lonzacure (registered trademark)" M-DIPA (active hydrogen equivalent 92 g/eq), "Lonzacure (registered trademark)" M-MIPA (active hydrogen equivalent 78 g/eq), and "Lonzacure (registered trademark)" DETDA 80 (active hydrogen equivalent 45 g/eq) (each manufactured by Lonza, Inc.).

Examples of the other amine-based curing agent that can be used as component (d1) include metaphenylene diamine, diaminodiphenylmethane, metaxylene diamine, isophorone diamine, triethylenetetramine and the like.

Further, examples of the acid anhydride that can be used as component (d1) include hydrogenated methyl nadic anhydride, methyl hexahydrophthalic anhydride and the like.

As the radical polymerization initiator which can be used as the component (d2), azo compounds, peroxide compounds, photo radical polymerization initiators and the like can be mentioned. In particular, it is preferable to use at least one curing agent selected from peroxide compounds.

Examples of the azo compounds include 2,2-azobis(isobutyronitrile), 2,2-azobis(2,4-dimethylvaleronitrile), dimethyl 2,2-azobis(2-methylpropionate), 2,2-azobis(2-methylbutyronitrile), 1,1-azobis(cyclohexane-1-carbonitrile), 2,2-azobis(N-butyl-2-methylpropionamide), dimethyl 1,1-azobis(1-cyclohexanecarboxylate) and the like.

Examples of the peroxide compounds include methyl ethyl ketone peroxide, methyl cyclohexanone peroxide, methyl acetoacetate peroxide, acetylacetone peroxide, 1,1-bis(t-butylperoxy)3,3,5-trimethylcyclohexane, 1,1-bis(t-hexylperoxy)cyclohexane, 1,1-bis(t-hexylperoxy)3,3,5-trimethylcyclohexane, 1,1-bis(t-butylperoxy)cyclohexane, 2,2-bis(4,4-di-t-hexylperoxycyclohexyl)propane, 1,1-bis(t-butylperoxy)cyclododecane, n-butyl 4,4-bis(t-butylperoxy)valerate, 2,2-bis(t-butylperoxy)butane, 1 1-bis(t-butylperoxy)-2-methylcyclohexane, t-butyl hydroperoxide, P-menthane hydroperoxide, 1,1,3,3-tetramethylbutyl hydroperoxide, t-hexyl hydroperoxide, dicumyl peroxide, 2,5-dimethyl-2,5-bis(t-butyl)peroxy)hexane, α,α'-bis(t-butylperoxy)diisopropylbenzene, t-butylcumyl peroxide, di-t-butyl peroxide, 2,5-dimethyl-2,5-bis(t-butylperoxy)hexyne-3, isobutyryl peroxide, 3,5,5-trimethylhexanoyl peroxide, octanoyl peroxide, lauroyl peroxide, cinnamate peroxide, m-toluoyl peroxide, benzoyl peroxide, diisopropyl peroxydicarbonate, bis(4-t-butylcyclohexyl)peroxydicarbonate, di-3-methoxybutylperoxydicarbonate, di-2-ethylhexylperoxydicarbonate, di-sec-butylperoxydicarbonate, di(3-methyl-3-methoxybutyl)peroxydicarbonate, di(4-t-butylcyclohexyl)peroxydicarbonate, α,α'-bis(neodecanoylperoxy)diisopropylbenzene, cumylperoxyneodecanoate, 1,1,3,3-tetramethylbutylperoxyneodecanoate, 1-cyclohexyl-1-methylethylperoxyneodecanoate, t-hexylperoxyneodecanoate, t-butylperoxyneodecanoate, t-hexyperoxypivalate, t-butylperoxypivalate, 2,5-dimethyl-2,5-bis(2-ethylhexanoylperoxy)hexane, 1,1,3,3-tetramethylbutylperoxy-2-ethylhexanoate, 1-cyclohexyl-1-methylperoxy-2-ethylhexanoate, t-hexylperoxy-2-ethylhexanoate, t-butylperoxy-2-ethyl hexanoate, t-butylperoxyisobutyrate, t-butylperoxymaleic acid, t-butylperoxylaurate, t-butylperoxy-3,5,5-trimethylhexanoate, t-hexylperoxyisopropyl monocarbonate, t-butylperoxyisopropyl monocarbonate, t-butylperoxy-2-ethylhexyl monocarbonate, 2,5-dimethyl-2,5-bis(benzoylperoxy)hexane, t-butylperoxyacetate, t-hexylperoxybenzoate, t-butylperoxy-m-toluoylbenzoate, t-butylperoxybenzoate, bis(t-butylperoxy)isophthalate, t-butylperoxyallyl monocarbonate, 3,3',4,4'-tetra(t-butylperoxycarbonyl)benzophenone, dibenzoyl peroxide, di-t-hexyl peroxide, diisopropylbenzene hydroperoxide, and the like.

Examples of the radical photopolymerization initiator include benzophenone, 4,4-bis(diethylamino)benzophenone, 2,4,6-trimethylbenzophenone, methyl o-benzoylbenzoate, 4-phenylbenzophenone, 2-hydroxy-1-[4-[4-(2-hydroxy-2-methyl-propionyl)benzyl]phenyl]-2-methylpropan-1-one, t-butylanthraquinone, 2-ethylanthraquinone, diethoxyacetophenone, 2-hydroxy-2-methyl-1-phenylpropane-1-one, benzyldiinethyl ketal, 1-hydroxycyclohexyl-phenyl ketone, benzoin methyl ether, benzoin ethyl ether, benzoin isopropyl ether, benzoin isobutyl ether, 2-methyl-4-(methylthio)phenyl]-2-morpholino-1-propanone, 2-benzyl-2-dimethylamino-1-(4-morpholinophenyl)- butanone-1, diethylthioxanthone, isopropylthioxanthone, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)-phenylphosphine oxide, methyl benzoyl formate, and the like.

The above compounds can be used alone or in combination of two or more as the component (d2), but in terms of storage stability of the prepreg, those having a 10-hour half-life temperature of 100° C. or higher are preferable.

The amount of component (d2) is preferably 0.1 to 5 parts by mass, more preferably 0.2 to 3 parts by mass, with respect to 100 parts by mass of total of all epoxy resins and all (meth)acrylate compounds contained in the curable resin composition of the present invention. When the amount of the component (d2) is 0.1 parts by mass or more, the (meth)acrylate compounds contained in the curable resin composition are likely to be sufficiently cured. On the other hand, when the amount of the component (d2) is 5 parts by mass or less, a resin composition having excellent storage stability is likely to be obtained.

In the present specification, the term "all (meth)acrylate compounds" means the (meth)acrylate compounds as the component (C), or total of the (meth)acrylate compounds as the component (C) and component (G) (to be described later) when the curable resin composition of the present invention further contains the component (G).

<Component (E)>

The thermoplastic resin may be, if necessary, blended into the curable resin composition of the present invention as a component (E) for the purpose of controlling resin flow during molding of the curable resin composition and imparting toughness to a resulting cured resin product. That is, the present resin composition preferably further contains a thermoplastic resin as the component (E).

The present resin composition preferably contains the component (E) in an amount of 1 part by mass or more and 15 parts by mass or less, preferably 2 parts by mass or more and 10 parts by mass or less, with respect to 100 parts by mass of total of all epoxy resins contained in the present resin composition.

When the amount of the component (E) is 1 part by mass or more, sufficient effects of resin flow control and physical-property improvement are likely to be achieved, which is favorable. On the other hand, when the amount of the component (E) is 15 parts by mass or less, the viscosity of the curable resin composition, the heat resistance and mechanical properties of the cured resin product, and the tack and drape of the prepreg are likely to be sufficiently maintained, which is favorable.

Non-limiting examples of the thermoplastic resin include polyamide, polyester, polycarbonate, polyether sulfone, polyphenylene ether, polyphenylene sulfide, polyetheretherketone, polyetherketone, polyimide, polytetrafluoroethylene, polyether, polyolefin, liquid crystal polymer, polyarylate, polysulfone, polyacrylonitrile styrene, polystyrene, polyacrylonitrile, polymethyl methacrylate, ABS (acrylonitrile-butadiene-styrene copolymer), AES (acrylonitrile-ethylene-propylene rubber-styrene copolymer), ASA (acrylonitrile-acrylate rubber-styrene copolymer), polyvinyl chloride, polyvinyl formal resin, phenoxy resin, and block polymers.

Among these, phenoxy resin, polyether sulfone and polyvinyl formal resin are preferable because they are excellent in resin flow controllability and the like. Also, the phenoxy resin and the polyether sulfone are preferable from the viewpoint of further improving the heat resistance and flame retardancy of the cured resin product, and the polyvinyl formal resin is preferable from the viewpoint of ease in controlling the tack of the obtained prepreg within an appropriate range without deteriorating the heat resistance of the cured product and improving the adhesion between the reinforcing fibers and the epoxy resin composition. The block polymers are preferable because they improve toughness and impact resistance.

One of these thermoplastic resins may be used alone, or two or more thereof may be used in combination.

Non-limiting examples of the phenoxy resin include YP-50, YP-50S, YP70, ZX-1356-2, and FX-316 (each manufactured by Nippon Steel & Sumikin Chemical Co., Ltd.).

Non-limiting examples of the polyvinyl formal resin include Vinylec (registered trademark) K (mass average molecular weight: 59,000), Vinylec L (mass average molecular weight: 66,000), Vinylec H (mass average molecular weight: 73,000), and Vinylec E (mass average molecular weight: 126,000), all of which are manufactured by JNC Corporation.

Further, when the cured resin product is required to have heat resistance at a temperature exceeding 180° C., polyether sulfone and polyether imide are preferably used.

Specific examples of the polyether sulfone include Sumika Excel (registered trademark) 3600P (weight average molecular weight: 16,400), Sumika Excel 5003 P (mass average molecular weight: 30,000), Sumika Excel 5200 P (mass average molecular weight: 35,000), and Sumika Excel 7600P (mass average molecular weight: 45,300), all of which are manufactured by Sumitomo Chemical Co., Ltd.

Non-limiting examples of the polyether imide include ULTEM 1000 (mass average molecular weight: 32,000), ULTEM 1010 (mass average molecular weight: 32,000), and ULTEM 1040 (mass average molecular weight: 20,000), all of which are manufactured by SABIC Innovative Plastics Co., Ltd.

Non-limiting examples of the block copolymers include Nanostrength M52, Nanostrength M52N, Nanostrength M22, Nanostrength M22N, Nanostrength 123, Nanostrength 250, Nanostrength 012, Nanostrength E20, and Nanostrength E40, which are manufactured by ARKEMA; and TPAE-23, TPAE-31, TPAE-38, TPAE-63, TPAE-100, and PA-260, which are manufactured by T & K TOKA Corporation.

For the purpose of adjusting the viscoelasticity of the present resin composition in an uncured state to improve the workability and improving the strength, elastic modulus, toughness and heat resistance of the cured resin product, the present resin composition may include the epoxy resins described below as a component (F).

The component (F) is not particularly limited as long as it is an epoxy resin other than the bisphenol epoxy resins used as the component (A) and the component (B) and is suitable for the above purposes, but bi- or more-functional epoxy resins are preferably used. Examples of such epoxy resins include bisphenol S epoxy resins, bisphenol E epoxy resins, bisphenol Z epoxy resins, bisphenol AD epoxy resins, bisphenol epoxy resins other than those used as the component (A) or the component (B), biphenyl epoxy resins, naphthalene epoxy resins, dicyclopentadiene epoxy resins, phenol novolac epoxy resins, cresol novolac epoxy resins, trisphenol methane epoxy resins, glycidyl amine epoxy resins such as tetraglycidyldiaminodiphenylmethane and triglycidylaminophenol; glycidyl ether epoxy resins other than mentioned above, such as tetrakis(glycidyloxyphenyl)ethane and tris(glycidyloxy)methane, epoxy resins as modified products of those exemplified above, phenol aralkyl epoxy resins, and the like.

A tri- or more-functional epoxy resin can provide more excellent strength, elastic modulus, and heat resistance. Therefore, it is preferable to use triglycidyl para- or meta-aminophenol epoxy resins, tetraglycidyl diaminodiphenylmethane epoxy resins, phenol novolac epoxy resins, and cresol novolac epoxy resins.

Non-limiting examples of the commercially available epoxy resins usable as the component (F) include jER1001 (epoxy equivalent 475 g/eq), jER 1002 (epoxy equivalent 650 g/eq), jER 604 (epoxy equivalent 120 g/eq), jER 630 (epoxy equivalent 98 g/eq), jER1032H60 (epoxy equivalent 169 g/eq), jER 152 (epoxy equivalent 175 g/eq), jER 154 (epoxy equivalent 178 g/eq), YX-7700 (epoxy equivalent 273 g/eq), and YX-4000 (epoxy equivalent 186 g/eq) (each manufactured by Mitsubishi Chemical Corporation); GAN (epoxy equivalent: 125 g/eq), GOT (epoxy equivalent: 135 g/eq), NC-2000 (epoxy equivalent: 241 g/eq), and NC-3000 (epoxy equivalent: 275 g/eq) (each manufactured by Nippon Kayaku Co., Ltd.); YDPN-638 (epoxy equivalent 180 g/eq), and TX-0911 (epoxy equivalent 172 g/eq) (each manufactured by Nippon Steel & Sumikin Chemical Co., Ltd.); Epon 165 (epoxy equivalent 230 g/eq) (manufactured by Momentive Specialty Chemicals Inc.); MY-0500 (epoxy equivalent 110 g/eq), MY-0600 (epoxy equivalent 106 g/eq), and ECN-1299 (epoxy equivalent 230 g/eq) (each manufactured by Huntsman Japan K.K.); HP-4032 (epoxy equivalent 150 g/eq), HP-4700 (epoxy equivalent 162 g/eq), HP-7200 (epoxy equivalent 265 g/eq), and TSR-400 (each manufactured by DIC Corporation); AER 4152, AER 4151, LSA 3301, and SA2102 (each manufactured by Asahi Kasei E-materials Corp.); ACR1348 (epoxy equivalent 350 g/eq) (manufactured by Adeka Corporation); DER 852 (epoxy equivalent 320 g/eq), and DER 858 (epoxy equivalent 400 g/eq) (each manufactured by THE DOW CHEMICAL COMPANY); and the like.

The amount of component (F) is preferably 5 to 35 parts by mass, more preferably 10 to 30 parts by mass, with respect to 100 parts by mass of total of all epoxy resins contained in the curable resin composition of the present invention. When the amount of the component (F) is 5 mass parts or more, a sufficient physical-property improvement effect is likely to be achieved, which is favorable. On the other hand, when the amount of the component (F) is 35 mass parts or less, the characteristics of the curable resin composition of the present invention are likely to be satisfactorily maintained, which is favorable.

The present resin composition may contain, as a component (G), the following monofunctional (meth)acrylate compounds for the purpose of controlling the cross-linked structure of the present resin composition, reducing the viscosity, and imparting adhesiveness. The term "monofunctional (meth)acrylate compounds" means acrylate compounds and/or methacrylate compounds having one double bond in one molecule. Specific examples of compounds that can be used as the component (G) include (meth)acrylates, such as 2-hydroxyethyl (meth)acrylate, 2-hydroxypropyl (meth)acrylate, 4-hydroxybutyl (meth)acrylate, tetrahydrofurfuryl (meth)acrylate, phenoxyethyl (meth)acrylate, cyclohexyl (meth)acrylate, isobornyl (meth)acrylate, norbornyl (meth)acrylate, 2-(meth)acryloyloxymethyl-2-methylbicycloheptane, adamantyl (meth)acrylate, benzyl (meth)acrylate, phenyl (meth)acrylate, dicyclopentenyl (meth)acrylate, dicyclopentanyl (meth)acrylate, tetracyclododecanyl (meth)acrylate, cyclohexanedimethanol mono (meth)acrylate, 2-methoxyethyl (meth)acrylate, 3-methoxybutyl (meth)acrylate, methoxytriethylene glycol (meth)acrylate, butoxyethyl (meth)acrylate, methoxydipropylene glycol (meth) acrylate, 4-acryloyloxymethyl-2-methyl-2-ethyl-1,3-dioxolane, 4-acryloyloxymethyl-2-methyl-2-isobutyl-1,3-dioxolane, o-phenylphenol (meth)acrylate, ethoxylated o-phenylphenol (meth)acrylate, N-(meth) acryloyloxyethyl hexahydrophthalimide, paracumyl phenol (meth)acrylate, ethoxylated paracumyl phenol (meth)acrylate, and trimethylolpropane formal (meth)acrylate; vinyl ester monomers such as vinyl acetate, vinyl butyrate, N-vinylformamide, N-vinylacetamide, N-vinyl-2-pyrrolidone, N-vinylcaprolactam, and divinyl adipate; vinyl ethers, such as ethyl vinyl ether, and phenyl vinyl ether; and acrylamides, such as acrylamide, N,N-dimethyl acrylamide, N,N-dimethyl methacrylamide, N-methylol acrylamide, N-methoxymethyl acrylamide, N-butoxymethyl acrylamide, N-t-butyl acrylamide, acryloyl morpholine, hydroxyethyl acrylamide, and methylene bisacrylamide.

One of these may be used alone, or two or more of these may be used in combination.

Among these, a compound having a cyclic structure in its molecule is preferable because the cure shrinkage of the composition to be obtained is low and the strength of the resulting cured product is excellent.

In the present invention, the amount of the component (G) is not particularly limited, but is preferably in the range of 0.1 to 5 parts by mass with respect to 100 parts by mass of total of all epoxy resins contained in the present resin composition. If the amount of the component (G) is 0.1 mass part or more, a sufficient physical-property improvement effect is likely to be achieved, which is favorable. On the other hand, when the amount of the component (G) is 5 mass parts or less, the characteristics of the curable resin composition of the present invention are likely to be satisfactorily maintained, which is favorable.

<Component (H)>

The component (H) is an oxazolidone ring-containing epoxy resin.

The oxazolidone ring-containing epoxy resin is an epoxy resin having an oxazolidone ring structure, which improves the workability at normal temperature of a prepreg containing the epoxy resin composition containing the oxazolidone ring-containing epoxy resin, and also improves the elastic modulus and heat resistance of the cured product of the epoxy resin composition as well as the adhesion thereof with reinforcing fibers.

An oxazolidone-ring structure is generated through addition reaction of an isocyanate group and an epoxy group. The method for producing the oxazolidone skeleton-containing epoxy resin in the present invention is not particularly limited. For example, the oxazolidone skeleton-containing epoxy resin can be obtained in an approximately theoretical amount by reacting an isocyanate compound and an epoxy resin having a biphenyl skeleton in the presence of an oxazolidone ring formation catalyst. The isocyanate compound and the epoxy resin are preferably reacted with an equivalent ratio in a range of 1:2 to 1:10. When the ratio is within the above range, the cured product of the epoxy resin is likely to have further improved heat resistance and water resistance. In the present invention, various isocyanate compounds can be used as raw materials, but in order to incorporate the oxazolidone ring structure into the skeleton of the epoxy resin, it is preferable to use an isocyanate compound having a plurality of isocyanate groups. Moreover, for imparting higher heat resistance to the cured product of the epoxy resin composition containing the component (H), it is preferable to use a diisocyanate which has a rigid structure.

Non-limiting specific examples of the isocyanate compound usable as a raw material include bifunctional isocyanate compounds such as methane diisocyanate, butane-1,1-diisocyanate, ethane-1,2-diisocyanate, butane-1,2-diisocyanate, transvinylidene diisocyanate, propane-1,3-diisocyanate, butane-1,4-diisocyanate, 2-butene-1,4-diisocyanate, 2-methylbutene-1,4-diisocyanate, 2-methylbutane-1,4-diisocyanate, pentane-1,5-diisocyanate 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-isocyanate, dimethylsilane diisocyanate, diphenylsilane diisocyanate, ω,ω'-1,3-dimethylbenzene diisocyanate, ω,ω'-1,4-dimethylbenzene diisocyanate, ω,ω'-1,3-dimethylcyclohexane diisocyanate, ω,ω'-1,4-dimethylcyclohexane diisocyanate, ω,ω'-1,4-dimethylnaphthalene diisocyanate, ω,ω'-1,5-dimethylnaphthalene diisocyanate, cyclohexane-1,3-diisocyanate, cyclohexane-1,4-diisocyanate, 3-isocyanatomethyl-3,5,5-trimethylcyclohexyl isocyanate, dicyclohexylmethane-4,4'-diisocyanate, 1,3-phenylene diisocyanate, 1,4-phenyne diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenyl ether-4, 4'-diisocyanate, diphenylether-2,4'-diisocyanate, naphthalene-1,4-diisocyanate, naphthalene-1,5-diisocyanate, biphenyl-4,4'-diisocyanate, 3,3'-di methylbiphenyl-4,4'-diisocyanate, 2,3'-dimethoxybisphenyl-4,4'-diisocyanate, diphenylmethane-4,4'-diisocyanate, 3,3'-dimethoxydiphenylmethane-4,4'-diisocyanate, 4,4'-dimethoydiphenylmethane-3,3'-diisocyanate, norbornene diisocyanate, diphenylsulfite-4,4'-diisocyanate, and diphenyl sulfone-4,4'-diisocyanate; multifunctional isocyanate compounds such as polymethylene polyphenyl isocyanate, triphenylmethane triisocyanate, and tris(4-phenylisocyanate thiophosphate)-3,3',4,4'-diphenylmethane tetraisocyanate; multimers such as dimers and trimers of the above-mentioned isocyanate compounds; blocked isocyanates masked by an alcohol or phenol, and bisurethane compounds; and the like. These isocyanate compounds may be used in combination of two or more thereof.

Among the above-mentioned isocyanate compounds, from the viewpoint of tendency of improving heat resistance, preferred are bifunctional or trifunctional isocyanate compounds, more preferred are bifunctional isocyanate compounds, still more preferred are bifunctional isocyanate compounds having a skeleton selected from isophorone, benzene, toluene, diphenylmethane, naphthalene, norbornene, polymethylene polyphenylene polyphenyl and hexamethylene. When the number of functional groups of the isocyanate compound is too large, the storage stability of the epoxy resin composition tends to decrease. When the number of functional groups is too small, the heat resistance of the cured product obtainable from the epoxy resin composition tends to decrease.

Further, as the epoxy resin used as the raw material of the component (H), various epoxy resins can be used. However, for efficiently incorporating an oxazolidone ring structure into the skeleton of an epoxy resin, it is preferable to use an epoxy resin having epoxy groups at both terminals of its molecule. Non-limiting specific examples of the epoxy resin usable as the raw material of the component (H) include epoxy resins derived from dihydric phenols such as bisphenol A, bisphenol F, bisphenol AD, bisphenol S, tetramethyl bisphenol A, tetramethyl bisphenol F, tetramethyl bisphenol AD, tetramethylbisphenol S and tetrabromobisphenol A; epoxy resins derived from tris(glycidyloxyphenyl)alkanes such as 1,1,1-tris(4-hydroxyphenyl)methane, and 1,1,1-(4-hydroxyphenyl)ethane, 4,4-[1-[4-[1-(4-hydroxyphenyl)-1-methylethyl]phenyl]ethylidene]bisphenol; and epoxy resins derived from novolak, such as phenol novolac, cresol novolak, and bisphenol A novolak. As the epoxy resin, bisphenol A epoxy resin, bisphenol F epoxy resin, biphenyl epoxy resin and the like are particularly preferable because the viscosity of the component (H) is not excessively high.

As the isocyanate compound, especially preferred is an addition reaction product obtained by mixing and reacting one molecule of a bifunctional isocyanate having a toluene skeleton such as tolylene diisocyanate (e.g., 1-methylbenzene-2,4-diisocyanate, 1-methylbenzene-2,5-diisocyanate, 1-methylbenzene-2,6-diisocyanate, or 1-methylbenzene-3,5-diisocyanate) as an isocyanate compound with two molecules of bisphenol A diglycidyl ether as an epoxy resin, because the workability of the prepreg at normal temperature and the heat resistance of a cured product of the epoxy resin composition can be improved.

Examples of the commercial products of the epoxy resin (component (H)) having an oxazolidone ring structure include AER4152, AER4151, LSA3301, and LSA2102 (each being a product name of Asahi Kasei E-materials Corp.); ACR1348 (product name of ADEKA Co., Ltd.); DER 852 and DER 858 (each being a product name of THE DOW CHEMICAL COMPANY); and TSR-400 (product name of DIC, Incorporated), all of which are preferably used in the present invention. Among these, AER4152 and TSR-400 are particularly preferred.

As the component (H), two or more of the epoxy resins as described above may be used in combination.

The amount of the component (H) is preferably 5 mass parts by mass or more and 60 mass parts by mass or less with respect to 100 mass parts of total of all the epoxy resins contained in the epoxy resin composition of the present invention. When the amount of the component (H) is 5 parts by mass or more, a cured resin product having excellent heat resistance and mechanical properties is likely to be obtained. The amount of the component (H) is more preferably 10 mass parts or more, still more preferably 15 mass parts or more. On the other hand, when the amount of the component (H) is 60 parts by mass or less, a prepreg having excellent tack and drape can be obtained, and a cured resin product having high fracture toughness and being free of voids can be obtained. The amount of the component (H) is more preferably 55 parts by mass or less, still more preferably 50 parts by mass or less. The amount of the component (H) is more preferably in the range of 10 to 55 parts by mass, and particularly preferably in the range of 15 to 50 parts by mass.

In the present invention, each of the amounts (parts by mass) of the components (A), (B), (F) and (H) can also be understood as representing the amount in terms of % by mass relative to the total mass of all epoxy resins contained in the epoxy resin composition of the present invention.

<Optional Component>

The present resin composition may, if necessary, contain various known additives as long as the effects of the present invention are not impaired, and an antioxidant or a light stabilizer may be added to the resin composition in order to improve the storage stability of the composition or to prevent discoloration and degradation of a cured product layer.

Specific examples thereof include Sumilizer BHT, Sumilizer S, Sumilizer BP-76, Sumilizer MDP-S, Sumilizer GM, Sumilizer BBM-S, Sumilizer WX-R, Sumilizer NW, Sumilizer BP-179, Sumilizer BP-101, Sumilizer GA-80, Sumilizer TNP, Sumilizer TPP-R, and Sumilizer P-16 (each manufactured by Sumitomo Chemical Co., Ltd.); Adeka Stab AO-20, Adeka Stab AO-30, Adeka Stab AO-40, Adeka Stab AO-50, Adeka Stab AO-60, Adeka Stab AO-70, Adeka Stab AO-80, Adeka Stab AO-330, Adeka Stab PEP-4C, Adeka Stab PEP-8, Adeka Stab PEP-24G, Adeka Stab PEP-36, Adeka Stab HP-10, Adeka Stab 2112, Adeka Stab 260, Adeka Stab 522A, Adeka Stab 329K, Adeka Stab 1500, Adeka Stab C, Adeka Stab 135A, and Adeka Stab 3010 (each manufactured by Adeka Corporation); Tinuvin 770, Tinuvin 765, Tinuvin 144, Tinuvin 622, Tinuvin 111, Tinuvin 123, and Tinuvin 292 (each manufactured by Ciba Specialty Chemicals); Fancryl FA-711M and FA-712HM (each manufactured by Hitachi Chemical Company, Ltd.); and the like.

The amounts of the antioxidant and the light stabilizer are not specifically limited, and each may range from preferably 0.001 to 5 parts by mass, more preferably 0.01 parts to 3 parts by mass, based on the total of all epoxy resins and all (meth)acrylate compounds contained in the curable resin composition.

Examples of other additives include known additives, such as elastomers, thermoplastic elastomers, flame retardants (e.g., phosphorus-containing epoxy resins, red phosphorus, phosphazene compounds, phosphate salts, phosphate esters, etc.), silicone oils, wetting dispersants, antifoaming agents, defoaming agents, natural waxes, synthetic waxes, metal salts of linear fatty acids, acid amides, esters, mold release agents such as paraffins, crystalline silica, fused silica, calcium silicate, alumina, calcium carbonate, talc, powders of barium sulfate or the like, metal oxides, metal hydroxides, glass fibers, carbon nanotubes, inorganic fillers such as fullerenes, carbon fibers, organic fillers such as cellulose nanofibers, inorganic fillers subjected to surface organic treatment, etc., carbon black, coloring agents such as Bengala, silane coupling agents, and conductive materials. Furthermore, if necessary, a slip agent, a leveling agent, a polymerization inhibitor such as hydroquinone monomethyl ether, an ultraviolet light absorber and the like may also be blended.

One of these may be used alone, or two or more of these may be used in combination.

<Viscosity of Curable Resin Composition>

The lower limit value of the viscosity of the present resin composition at 30° C. is preferably 100 Pa·s or more, more preferably 300 Pa·s or more, and still more preferably 500 Pa·s or more, from the viewpoint of adjustment of tack on the surface of the prepreg to be obtained and workability. The upper limit value of the viscosity is preferably 1,000,000 Pa·s or less, more preferably 900,000 Pa·s or less, and still more preferably 800,000 Pa·s or less.

The viscosity of the present resin composition at 60° C. is preferably 10 Pa·s or more, more preferably 20 Pa·s or more, and still more preferably 30 Pa·s or more, from the viewpoint of the quality of the prepreg to be obtained. In addition, from the viewpoint of impregnation into the reinforcing fiber mass and molding processability of a prepreg, the viscosity is preferably 1,000 Pa·s or less, more preferably 900 Pa·s or less, and still more preferably 800 Pa·s or less.

With respect to the minimum viscosity of the present resin composition, the lower limit value thereof is preferably 0.05 Pa·s, more preferably 0.07 Pa·s, and still more preferably 0.1 Pa·s, from the viewpoint of flowability control of the resin during the molding (suppression of alignment disorder of reinforcing fibers). The upper limit value of the minimum viscosity is preferably 50 Pa·s, more preferably 40 Pa·s, and still more preferably 30 Pa·s.

The minimum viscosity is defined as a point at which the viscosity is the lowest in the viscosity curve obtained when the viscosity of the curable resin composition is measured in the temperature rising mode.

The viscosity of the curable resin composition is determined, for example, by a rotational viscometer (product name "AR-G2", manufactured by TA Instruments) using 25 mmφ parallel plates under the following conditions: plate gap of 500 μm, heating rate of 2° C./min, angular velocity of 10 rad/sec, and stress of 300 Pa.

<Pot Life of Curable Resin Composition>

The present resin composition is excellent in pot life. For example, when the glass transition point of the curable resin composition is measured immediately after compounding and after having been stored for 90 days at a temperature 20° C. under a humidity 50%, the increase in the glass transition point after 90 days can be suppressed to 20° C. or less. The suppression of increase in the glass transition point to 20° C. or less is favorable in that, even when the curable resin composition of the present invention is made into a prepreg and then stored for a long time at normal temperature, the reaction of the matrix resin is suppressed, the tack and drape of the prepreg remain within preferable ranges, and the prepreg remain suitable for handling. More preferably, the increase in the glass transition point is suppressed to 15° C. or less. The glass transition point can be determined by differential scanning calorimetry (DSC).

<Physical Properties of Resin Plate>

With respect to the curable resin composition of the present invention, the flexural modulus of the cured resin product is preferably in the range of 3.5 to 6 GPa, and the elongation at break of the cured resin product is preferably in the range of 7 to 15%. More preferably, the flexural modulus is 3.7 to 5 GPa and the elongation at break is 8 to 14%. When the flexural modulus is less than 3.5 GPa or the elongation at break is well over 15%, the static strength of the fiber-reinforced composite material may become insufficient. When the flexural modulus exceeds 6 GPa or the elongation at break is less than 7%, the toughness of the fiber-reinforced composite material is likely to become insufficient, and the impact resistance of the fiber-reinforced composite material may become insufficient.

<Method for Producing Curable Resin Composition and Its Use>

As a non-limiting example of the method for producing the curable resin composition of the present invention, the resin composition can be produced by mixing the components described above.

As a method for mixing the components, a method using a mixer such as a triple roll mill, a planetary mixer, a kneader, a homogenizer, a homodisper, etc. can be mentioned.

For example, as described later, the present resin composition can be used to produce a prepreg by impregnating a reinforcing fiber mass with the resin composition. In addition, a film of the present resin composition can be obtained by applying the present resin composition to a release paper and curing the resin composition.

<Effects>

The present resin composition described above includes the component (A), the component (B), the component (C) and the component (D) which are described above, and, if necessary, the component (H), the component (E), the component (F), the component (G) and other additives; therefore, the use of the present resin composition enables the production of a fiber-reinforced composite material excellent in mechanical properties.

[Molded Article]

The molded article of the present invention is formed from the cured product of the curable resin composition of the present invention described above.

As a method for molding the curable resin composition, for example, the molding can be performed by an injection molding method (including insert molding using a film, a glass plate, etc.), an injection compression molding method, an extrusion molding method, a blow molding method, a vacuum molding method, an air-pressure molding method, a calendar molding method, and an inflation molding method. Among these, an injection molding method and an injection compression molding method are preferable because molded articles with excellent mass productivity and high dimensional accuracy can be obtained, but the present invention is not limited thereto.

Since the molded article of the present invention is formed by molding the curable resin composition of the present invention, the molded article is excellent in mechanical properties; therefore, for example, the molded article is applicable to products for vehicles, housings for mobile devices, products for furniture, building materials and the like.

<Film Formed of Curable Resin Composition>

In one embodiment of the molded article of the present invention, the molded article is in the form of a film. This film is useful as an intermediate material for producing a prepreg, and as a surface protection film or an adhesive film when cured after being attached to a substrate.

Further, the method of such use is not limited, but it is preferable to apply the curable resin composition of the present invention to the surface of a substrate such as a release paper. The obtained coating layer in an uncured state may be attached to another substrate, followed by curing to obtain a film, or the coating layer per se may be cured so as to be used a film.

[Prepreg]

The prepreg of the present invention is formed of a mass of reinforcing fibers impregnated with the above-mentioned curable resin composition of the present invention. As a method of impregnating the reinforcing fiber mass with the present resin composition, a known method may be used, non-limiting examples of which include a wet method in which the present resin composition is dissolved in a solvent such as methyl ethyl ketone or methanol to lower the viscosity thereof and then allowed to impregnate the reinforcing fiber mass, and a hot melt method (dry method) in which the present resin composition is heated to lower the viscosity thereof and then allowed to impregnate the reinforcing fiber mass.

The wet method is a method in which reinforcing fibers are immersed in a solution of the curable resin composition, then pulled out of the solution, and the solvent is evaporated using an oven or the like. On the other hand, examples of the hot melt method include a method in which the reinforcing fibers are directly impregnated with the curable resin composition with its viscosity reduced by heating, and a method in which a film is prepared by coating the curable resin composition on a release paper or the like, which is then laminated on one of or both sides of the reinforcing fibers, followed by heating and pressurizing to impregnate the reinforcing fibers with the resin.

The hot melt method is preferable because substantially no solvent remains in the prepreg.

The amount of the curable resin composition in the prepreg of the present invention (hereinafter referred to as "resin content") is preferably 15 to 50% by mass, more preferably 20 to 45% by mass, and still more preferably 25 to 40% by mass, based on the total (100%) mass of the prepreg of the present invention. When the resin content is 15% by mass or more, sufficient adhesion strength between the reinforcing fiber mass and the curable resin composition can be secured. When the resin content is 50% by mass or less, high mechanical properties can be maintained.

The reinforcing fibers constituting the reinforcing fiber mass are not particularly limited, and those known as reinforcing fibers constituting the fiber-reinforced composite material may be appropriately selected depending on the application and the like. Specific example of usable reinforcing fibers include various inorganic fibers or organic fibers such as carbon fibers, aramid fibers, nylon fibers, high strength polyester fibers, glass fibers, boron fibers, alumina fibers, silicon nitride fibers and the like. Among these, carbon fibers, aramid fibers, glass fibers, boron fibers, alumina fibers and silicon nitride fibers are preferable from the viewpoint of specific strength and specific elasticity, and carbon fibers are particularly preferable from the viewpoint of mechanical properties and weight reduction. When carbon fibers are used as the reinforcement fibers, the carbon fibers may be surface-treated with a metal.

One kind of these reinforcing fibers may be used alone, or two or more kinds thereof may be used in combination.

From the viewpoint of the rigidity of the fiber-reinforced composite material obtained by curing the prepreg of the present invention, the strand tensile strength of the carbon fibers is preferably 1 to 9 GPa, more preferably 1.5 to 9 GPa, and the strand tensile modulus of the carbon fibers is preferably 150 to 1,000 GPa, more preferably 200 to 1,000 GPa.

The strand tensile strength and strand tensile modulus of the carbon fibers are values measured according to JIS R 7601: 1986.

The form of the reinforcing fiber mass is not particularly limited, and the reinforcing fiber mass may be in any form adopted by a base material used in conventional prepreg. For example, the reinforcing fiber mass may be one in which reinforcing fibers are oriented in one direction (UD: Unidirection), woven or non-woven fibers, or a non-crimp fabric.

Since the prepreg of the present invention is formed by impregnating the reinforcing fiber mass with the epoxy resin composition of the present invention, the prepreg can be used as a raw material of fiber-reinforced plastic excellent in mechanical properties.

[Fiber-Reinforced Plastic]

The fiber-reinforced plastic of the present invention includes a cured product of the above-mentioned curable resin composition of the present invention and reinforcing fibers.

As a non-limiting example of the method for producing the fiber-reinforced plastic of the present invention, for example, the fiber-reinforced plastic can be obtained by laminating layers of the above-mentioned prepreg of the present invention, followed by molding the resulting laminate, for example, by heat-curing the curable resin while applying pressure to the laminate.

The fiber-reinforced plastic of the present invention preferably contains carbon fibers as the reinforcing fibers because the resulting fiber-reinforced plastic is excellent in mechanical properties, flame retardancy, heat resistance, electromagnetic wave shielding ability and the like.

Non-limiting examples of the molding method for producing the fiber-reinforced plastic of the present invention includes a press molding method, an autoclave molding method, a bag molding method, a wrapping tape method, an internal pressure molding method, a sheet wrap molding method, and a method in which a filament or preform of a reinforcing fiber is impregnated with the curable resin composition, followed by curing to produce a molded article, e.g., RTM (Resin Transfer Molding), VaRTM (Vacuum assisted Resin Transfer Molding: vacuum resin impregnation manufacturing method), filament winding, and RFI (Resin Film Infusion).

The wrapping tape method is a method for forming a tubular body made of the fiber-reinforced composite material by winding the prepreg around a core such as a mandrel, and is suitable for producing a rod-like body such as a golf shaft or a fishing rod. More specifically, a prepreg is wound around a mandrel, and a wrapping tape formed of a thermoplastic resin film is wound around the prepreg for fixing and pressurizing the prepreg. Then, the epoxy resin composition is heated and cured in an oven, and subsequently the core is removed to obtain a fiber-reinforced plastic tube.

Further, in the internal pressure molding method, a preform obtained by winding a prepreg around an inner pressure-applying body such as a thermoplastic resin tube is set in a mold, and subsequently a high pressure gas is introduced into the inner pressure-applying body for applying a pressure, while heating the mold at the same time, to thereby perform molding. The inner pressure molding method can be especially preferably used in the case where a product having a complicated shape such as a golf shaft, a baseball bat or a racket for tennis or badminton is produced by molding.

A fiber-reinforced plastic using a cured product of the curable resin composition of the present invention as a matrix resin is suitably used in sports applications, general industrial applications, and aerospace applications. More specifically, in sport applications, the fiber-reinforced plastic is suitably used for golf shafts, fishing rods, tennis and badminton rackets, sticks for hockey etc., and ski poles. Furthermore, in general industrial applications, the fiber-reinforced plastic is suitably used for structural materials of moving bodies such as automobiles, ships, and railway vehicles, drive shafts, leaf springs, wind turbine blades, pressure vessels, flywheels, paper rollers, roofing materials, cables, repair reinforcement materials, and the like.

<Structured Body>

A structured body can be obtained from the fiber-reinforced plastic of the present invention described above. This structured body may consist only of the fiber-reinforced plastic of the present invention, or is composed of the fiber-reinforced plastic of the present invention and other materials (for example, metals, injection molded thermoplastic resin member, etc.).

This structured body is partially or entirely composed of the fiber-reinforced plastic of the present invention, whereby the structured body excels in flame retardancy and heat resistance.

This structured body is also applicable to, for example, interior parts of aircrafts and automobiles, and housings for electric and electronic devices.

[Fiber-Reinforced Plastic Tube]

The fiber-reinforced plastic tube is a fiber-reinforced plastic of the present invention which is tubular. That is, the fiber-reinforced plastic tube is a tubular fiber-reinforced plastic obtained by laminating, curing and molding the above-mentioned prepregs of the present invention by a known molding method such as a wrapping tape method.

Since the fiber-reinforced plastic tube of the present invention has excellent fracture strength and elastic modulus, it can be suitably used for golf shafts, fishing rods and the like.

The fiber-reinforced plastic tube can be obtained from a unidirectional prepreg in which reinforcing fibers aligned in one direction are impregnated with the resin composition of the present invention. The shape of the tube is not limited, but, for example, a composite material tube may be produced by laminating 2 plys of prepregs so that the fiber directions of the unidirectional prepregs are −45° and +45° with respect to the cylindrical axis direction, and further laminating 1 ply of prepreg so that the fiber direction of the unidirectional prepreg is parallel to the cylindrical axial direction, and the obtained composite material tube may be evaluated. The mandrel used here is a stainless steel round bar.

Specifically, as a non-limiting example of method for producing the fiber-reinforced plastic tube, the tube can be produced by the method described in the following (I) to (V).

(I) Two sheets of prepreg, each having a size of 200 mm in length×72 mm in width, are cut out from the prepared unidirectional prepreg such that the fiber axis direction is 45 relative to the long side direction. The two sheets of prepreg are laminated such that the fiber directions of the two sheets intersect each other and one side of each sheet protrudes by 9 mm in the short side direction.

(II) The laminated prepregs obtained above are wound around a release-treated mandrel so that the long side of the laminated prepregs and the axis of the mandrel are aligned in the same direction.

(III) A rectangular prepreg having a length of 200 mm and a width of 153 mm is cut out from the prepared unidirectional prepreg and wound around a mandrel such that the long side direction of the prepreg is aligned with the fiber direction of the prepreg, and the fiber direction is aligned with the mandrel axial direction.

(IV) The resulting is covered by wrapping thereon a heat resistant film tape as a wrapping tape, and is thermoformed in a curing furnace at 130° C. for 90 minutes. The width of the wrapping tape is 15 mm, the tension is 3 N, and the winding pitch (displacement distance in winding) is 1 mm, and this wrapping tape is wrapped so as to have the same thickness as the laminate.

(V) Thereafter, the mandrel is removed and the wrapping tape is removed to obtain a fiber-reinforced plastic tube.

EXAMPLES

Hereinbelow, the present invention will be specifically described by way of Examples which should not be construed as limiting the present invention. The raw materials used in the Example and Comparative Examples are shown below.

The softening point and the epoxy equivalent were measured under the following conditions.

1) Softening point: measured in accordance with JIS-K7234: 2008 (ring and ball method).

2) Epoxy equivalent: measured in accordance with JIS-K 7236: 2001.

"Raw Materials"

<Component (A)> jER 1007: Solid bisphenol A epoxy resin (softening point 128° C., manufactured by Mitsubishi Chemical Corporation, product name "jER 1007").

jER4007P: Solid bisphenol F epoxy resin (softening point: 108° C., manufactured by Mitsubishi Chemical Corporation, product name: "jER4007P").

jER4004P: Solid bisphenol F epoxy resin (softening point 85° C., manufactured by Mitsubishi Chemical Corporation, product name "jER4004P").

<Component (B)> jER 828: Liquid bisphenol A epoxy resin (epoxy equivalent 189 g/eq, manufactured by Mitsubishi Chemical Corporation, product name "jER 828").

jER 807: Liquid bisphenol F epoxy resin (epoxy equivalent 170 g/eq, manufactured by Mitsubishi Chemical Corporation, product name "jER 807").

<Component (C)>

Neopentyl glycol diacrylate
Polyethylene glycol #200 dimethacrylate
Trimethylolpropane trimethacrylate
Pentaerythritol tetraacrylate
Dipentaerythritol hexaacrylate
Dioxane glycol diacrylate
Isocyanuric acid EO-modified di- and tri-acrylates
2-[5-ethyl-5-[(acryloyloxy)methyl]-1,3-dioxane-2-yl]-2, 2-dimethylethyl acrylate
Dimethylol-tricyclodecane diacrylate
Pentaerythritol triacrylate toluene diisocyanate urethane prepolymer Pentaerythritol triacrylate hexamethylene diisocyanate urethane prepolymer <Component (d1)>

DICY15: dicyandiamide (active hydrogen equivalent 21 g/eq, manufactured by Mitsubishi Chemical Corporation, product name "jER Cure DICY15").

1400F: dicyandiamide (active hydrogen equivalent 21 g/eq, manufactured by Air Products and Chemicals, Inc., product name "DICYANEX 1400F").

DCMU-99: 3-(3,4-dichlorophenyl)-1,1-dimethylurea (Hodogaya Chemical Co., Ltd., trade name "DCMU-99").

Omicure 94: N,N-dimethyl-N'-phenylurea (manufactured by PTI Japan, Ltd., product name "Omicure 94").

U-CAT 3513N: isophorone diamine dimethyl urea (manufactured by San-Apro Ltd., product name "U-CAT 3513N").

Omicure 24: 2,4-bis(3,3-dimethylureido) toluene (manufactured by PT1 Japan, Ltd., product name "Omicure 24").

<Component (d2)>

Di-t-hexyl peroxide (10-hour half-life temperature 116.4° C.).

Dicumyl peroxide (10-hour half-life temperature 116.4° C.).

<Component (E)>

VINYLEC E: polyvinyl formal resin (manufactured by JNC Corporation, product name "VINYLEC E").

<Component (H)>

TSR-400: oxazolidone ring-containing epoxy resin (epoxy equivalent 338 g/eq, manufactured by DIC Corporation, product name "TSR-400").

LSA 3301: oxazolidone ring-containing epoxy resin (epoxy equivalent 403 g/eq, manufactured by Asahi Kasei Corporation, product name "LSA 3301").

<Carbon Fiber>

TR: manufactured by Mitsubishi Chemical Corporation, product name "PYROFIL TR50S15L".

MR: manufactured by Mitsubishi Chemical Corporation, product name "PYROFIL MR70 12P".

Example 1

Using jER4007P as the component (A), jER807 as the component (B), neopentyl glycol diacrylate as the component (C), DICY15 and DCMU-99 as the component (d1), di-t-hexyl peroxide as the component (d2), a curable resin composition was prepared as follows.

First, according to the compositional ratio described in Table 1, the component (B) (liquid) and the component (d1) (solid) were weighed into a container such that the mass ratio of solid component to liquid component became 1:1, followed by addition of a masterbatch containing the component (D). The resulting was stirred to mix the components. The resulting was further finely mixed with a three-roll mill to obtain a curing agent-containing masterbatch.

Subsequently, from the components described in Table 1, the component (A) and the component (B) other than used in the curing agent-containing masterbatch were weighed into a flask, heated to 140° C. using an oil bath, and allowed to be dissolved and mixed. After cooling to about 65° C., the component (C), the curing agent-containing master batch, and the component (d2) were added and stirred to obtain an uncured curable resin composition.

"Production of Resin Plate"

The uncured curable resin composition was poured between two glass plates, molded into a plate, heated at 2° C./min, heat-cured at an oven atmosphere temperature of 135° C. for 90 minutes, to produce a 2 mm-thick resin plate.

"Production of Prepreg"

The uncured curable resin composition was formed into a film by a comma coater ("M-500", manufactured by Hirano Tecseed Co., Ltd.), and a resin film with a resin coating weight of 16.7 g/m² was produced. Thus produced resin films were laminated on both sides of a carbon fiber sheet with a basis weight of 100 g/m² obtained by aligning carbon fibers, and the resulting was fed into heating rolls to allow the carbon fiber sheet to be impregnated with the resin, so as to obtain an uncured unidirectional prepreg having a basis weight of 133.4 g/m² and a resin content of 25% by mass.

"Production of Fiber-Reinforced Plastic Plate"

The uncured prepreg with a resin content of 25% by mass obtained above was cut into sheets of 300 mm×300 mm, and 24 sheets were laminated such that the relation between the angles of fiber directions of the sheets was [0°/0°/0°/0°/0°/0°/0°/0°/0°/0°/0°/0°/0°/0°/0°/0°/0°/0°/0°/0°/0°/0°/0°/0°], thereby obtaining a laminate. The laminate was heated in an autoclave at 2° C./min under a pressure of 0.04 MPa, held at 80° C. for 60 minutes, then heated at 2° C./min under a pressure of 0.6 MPa, and held at 130° C. for 90 minutes, thereby heat-curing the resin to obtain a fiber-reinforced plastic plate having a thickness of 2.1 mm "Fabrication of Fiber-Reinforced Plastic Tube"

The fiber-reinforced plastic tube was produced by the method described in (I) to (VI) below.

(I) Two sheets of rectangular prepreg, each having a size of 200 mm in length×72 mm in width, were cut out from the unidirectional prepreg with a resin content of 25% by mass prepared above such that the fiber axis direction was 45° relative to the long side direction. The two sheets pf prepreg were laminated such that the fiber directions of the two sheets intersect each other and one side of each sheet protrudes by 9 mm in the short side direction.

(II) The laminated prepregs obtained above were wound around a release-treated mandrel so that the long side of the laminated prepregs and the axis of the mandrel were aligned in the same direction. The mandrel used was a stainless steel round rod having a diameter of 6 mm and a length of 300 mm.

(III) A rectangular prepreg having a length of 200 mm and a width of 153 mm was cut out from the produced unidirectional prepreg and wound around a mandrel such that the long side direction of the prepreg was aligned with the fiber direction of the prepreg, and the fiber direction was aligned with the mandrel axial direction.

(IV) The resulting was covered by wrapping thereon a heat resistant film tape as a wrapping tape, and was thermoformed in a curing furnace at 130° C. for 90 minutes. The width of the wrapping tape was 15 mm, the tension was 3 N, and the winding pitch (displacement distance in winding) was 1 mm, and this wrapping tape was wrapped so as to have the same thickness as the laminate.

(V) Thereafter, the mandrel was removed and the wrapping tape was removed to obtain a fiber-reinforced plastic tube having an inner diameter of 6 mm and a length of 200 mm.

With respect to the produced resin plate, prepreg and fiber-reinforced plastic, various measurements and evaluations were performed according to the measurement and evaluation methods described below. The results are shown in Table 1.

"Measurement of Flexural Strength, Flexural Modulus, Elongation at Break (Fracture Strain) of Resin Plate"

The resin plate having a thickness of 2 mm obtained in the section "Production of Resin Plate" was processed into a test piece of 60 mm in length×8 mm in width. With respect to the test piece, the flexural strength, flexural modulus and elongation at break (fracture strain) of the resin plate were measured using a universal tester ("INSTRON 5565", manufactured by INSTRON) equipped with a 3-point bending jig (indenter R=3.2 mm, support R=3.2 mm, distance between supports (L)=32 mm) at a temperature of 23° C. under a humidity of 50% RH with a crosshead speed of 2 mm/min.

"Measurement of 0° Flexural Strength/Flexural Modulus, and 90 Flexural Strength/Flexural Modulus of Fiber-Reinforced Plastic Plate"

The fiber-reinforced plastic plate having a thickness of 2.1 mm produced in the section "Preparation of Fiber-Reinforced Plastic Plate" was processed into a test piece of 60 mm in length×12.7 mm in width. With respect to the test piece, the flexural properties of the fiber-reinforced plastic plate in terms of 0° flexural strength/flexural modulus, and 90° flexural strength/flexural modulus were measured using a universal tester ("INSTRON 5565", manufactured by INSTRON) equipped with a 3-point bending jig (indenter R=5.0 mm, support R=3.2 mm) with L/d=16 (L is a distance between supports and d is a thickness of the test piece) and a crosshead speed (per minute) of (L2×0.01)/(6×d).

"Measurement of Flexural Strength, Flexural Modulus and Strain at Maximum Load of Fiber-Reinforced Plastic Tube"

With respect to the fiber-reinforced plastic tube having an inner diameter of 6 mm and a length of 200 mm, which was obtained in the section "Fabrication of Fiber-Reinforced Plastic Tube", the flexural properties of the fiber-reinforced plastic tube in terms of flexural strength, flexural modulus and strain at maximum load were measured using a universal tester ("INSTRON 5565", manufactured by INSTRON) equipped with a 3-point bending jig (indenter R=75 mm, support R=12.5 mm, distance between supports (L)=150 mm) with a crosshead speed of 20 mm/min.

Examples 2 to 24, Comparative Example 1

Curable resin compositions were prepared in the same manner as in Example 1 except that the compositional ratios were changed to those shown in Tables 1 and 2, and resin plates, prepregs, fiber-reinforced plastic plates, fiber-reinforced plastic tubes were produced, on which various measurements and evaluations were performed. The evaluation results are shown in Table 1 and Table 2. (In Tables 1 and 2, each of the amounts of the component (A) and the component (B) is an amount (parts by mass) with respect to 100 parts by mass of total of all epoxy resins, the amount of the component (d2) is an amount (part by mass) with respect to 100 parts by mass of total of all epoxy resins and all (meth)acrylate compounds contained in the curable resin composition, and the amount of other components is an amount (part by mass) with respect to 100 parts by mass of total of all epoxy resins.)

TABLE 1

| Composition (part by mass) | | | Example | | | | | | |
|---|---|---|---|---|---|---|---|---|---|
| | | | 1 | 2 | 3 | 4 | 5 | 6 | 7 |
| Component (A) | jER1007 | | 0 | 0 | 0 | 0 | 50 | 0 | 0 |
| | jER4007P | | 50 | 50 | 50 | 50 | 0 | 50 | 50 |
| Component (B) | jER828 | | 0 | 0 | 0 | 0 | 50 | 0 | 0 |
| | jER807 | | 50 | 50 | 50 | 50 | 0 | 50 | 50 |
| Component (C) | Neopentyl glycol diacrylate | | 25 | 0 | 0 | 0 | 0 | 0 | 0 |
| | Polyethylene glycol # 200 dimethacrylate | | 0 | 25 | 0 | 0 | 0 | 0 | 0 |
| | Trimethylolpropane triacrylate | | 0 | 0 | 0 | 0 | 0 | 0 | 0 |
| | Trimethylolpropane trimethacrylate | | 0 | 0 | 25 | 0 | 0 | 0 | 0 |
| | Pentaerythritol tetraacrylate | | 0 | 25 | 0 | 25 | 25 | 0 | 0 |
| | Dipentaerythritol hexaacrylate | | 0 | 0 | 0 | 0 | 0 | 25 | 5 |
| | Isocyanuric acid EO-modified di- and tri-acrylates | | 0 | 0 | 0 | 0 | 0 | 0 | 0 |
| | 2-[5-ethyl-5-[(acryloyloxy)methyl]-1,3-dioxane-2-yl]-2,2-dimethylethyl acrylate | | 0 | 0 | 0 | 0 | 0 | 0 | 0 |
| | Dimethylol-tricyclodecane diacrylate | | 0 | 0 | 0 | 0 | 0 | 0 | 0 |
| | Pentaerythritol triacrylate toluene diisocyanate urethane prepolymer | | 0 | 0 | 0 | 0 | 0 | 0 | 0 |
| | Pentaerythritol triacrylate hexamethylene diisocyanate urethane prepolymer | | 0 | 0 | 0 | 0 | 0 | 0 | 0 |
| Component (D) | (d1) | DICY15 | 4.4 | 4.4 | 4.4 | 4.4 | 4 | 4.4 | 4.4 |
| | | 1400F | 0 | 0 | 0 | 0 | 0 | 0 | 0 |
| | | DCMU-99 | 3 | 3 | 3 | 3 | 3 | 3 | 3 |
| | | Omicure94 | 0 | 0 | 0 | 0 | 0 | 0 | 0 |
| | (d2) | Di-t-hexyl peroxide | 0.6 | 0.5 | 0.7 | 0.8 | 0.8 | 0.8 | 0.2 |
| Component (E) | VINYLEC E | | 0 | 0 | 0 | 0 | 0 | 0 | 0 |
| Physical Properties of Resin Plate | | | | | | | | | |
| | Flexural Strength [MPa] | | 177 | 164 | 182 | 179 | 170 | 174 | 166 |
| | Flexural Modulus [GPa] | | 3.95 | 3.79 | 4.09 | 4.11 | 3.8 | 3.96 | 3.73 |
| | Elongation at Break [%] | | 12.8 | 13.9 | 7.4 | 10.2 | 11.4 | 10.1 | 13.7 |

| Composition (part by mass) | | | Example | | | | | |
|---|---|---|---|---|---|---|---|---|
| | | | 8 | 9 | 10 | 11 | 12 | 13 |
| Component (A) | jER1007 | | 0 | 0 | 0 | 0 | 0 | 0 |
| | jER4007P | | 50 | 50 | 50 | 50 | 50 | 50 |
| Component (B) | jER828 | | 0 | 0 | 0 | 0 | 0 | 0 |
| | jER807 | | 50 | 50 | 50 | 50 | 50 | 50 |

TABLE 1-continued

| | | | | | | | |
|---|---|---|---|---|---|---|---|
| Component (C) | Neopentyl glycol diacrylate | 0 | 0 | 0 | 0 | 0 | 0 |
| | Polyethylene glycol # 200 dimethacrylate | 0 | 0 | 0 | 0 | 0 | 0 |
| | Trimethylolpropane triacrylate | 0 | 0 | 0 | 0 | 0 | 0 |
| | Trimethylolpropane trimethacrylate | 0 | 0 | 0 | 0 | 0 | 0 |
| | Pentaerythritol tetraacrylate | 0 | 0 | 0 | 0 | 0 | 0 |
| | Dipentaerythritol hexaacrylate | 5 | 15 | 15 | 35 | 35 | 45 |
| | Isocyanuric acid EO-modified di- and tri-acrylates | 0 | 0 | 0 | 0 | 0 | 0 |
| | 2-[5-ethyl-5-[(acryloyloxy)methyl]-1,3-dioxane-2-yl]-2,2-dimethylethyl acrylate | 0 | 0 | 0 | 0 | 0 | 0 |
| | Dimethylol-tricyclodecane diacrylate | 0 | 0 | 0 | 0 | 0 | 0 |
| | Pentaerythritol triacrylate toluene diisocyanate urethane prepolymer | 0 | 0 | 0 | 0 | 0 | 0 |
| | Pentaerythritol triacrylate hexamethylene diisocyanate urethane prepolymer | 0 | 0 | 0 | 0 | 0 | 0 |
| Component (D) (d1) | DICY15 | 4.4 | 4.4 | 4.4 | 4.4 | 4.4 | 4.4 |
| | 1400F | 0 | 0 | 0 | 0 | 0 | 0 |
| | DCMU-99 | 3 | 3 | 3 | 3 | 3 | 3 |
| | Omicure94 | 0 | 0 | 0 | 0 | 0 | 0 |
| (d2) | Di-t-hexyl peroxide | 0.7 | 0.5 | 0.8 | 0.9 | 1.1 | 1.0 |
| Component (E) | VINYLEC E | 0 | 0 | 0 | 0 | 0 | 0 |
| Physical Properties of Resin Plate | | | | | | | |
| | Flexural Strength [MPa] | 165 | 171 | 167 | 177 | 177 | 176 |
| | Flexural Modulus [GPa] | 4.07 | 3.84 | 3.83 | 4.39 | 3.96 | 4.29 |
| | Elongation at Break [%] | 14.1 | 13.5 | 10.9 | 7.7 | 11.9 | 8.4 |

TABLE 2

| | | Example | | | | | | |
|---|---|---|---|---|---|---|---|---|
| Composition (part by mass) | | 14 | 15 | 16 | 17 | 18 | 19 | 20 |
| Component (A) | jER1007 | 0 | 0 | 0 | 0 | 0 | 0 | 0 |
| | jER4007P | 50 | 50 | 50 | 50 | 50 | 50 | 50 |
| Component (B) | jER828 | 0 | 0 | 0 | 0 | 0 | 0 | 0 |
| | jER807 | 50 | 50 | 50 | 50 | 50 | 50 | 50 |
| Component (C) | Neopentyl glycol diacrylate | 0 | 0 | 0 | 0 | 0 | 0 | 0 |
| | Polyethylene glycol # 200 dimethacrylate | 0 | 0 | 0 | 0 | 0 | 0 | 0 |
| | Trimethylolpropane triacrylate | 0 | 0 | 0 | 0 | 0 | 0 | 0 |
| | Trimethylolpropane trimethacrylate | 0 | 0 | 0 | 0 | 0 | 0 | 0 |
| | Pentaerythritol tetraacrylate | 0 | 0 | 0 | 0 | 0 | 0 | 0 |
| | Dipentaerythritol hexaacrylate | 45 | 25 | 25 | 25 | 25 | 25 | 0 |
| | Isocyanuric acid EO-modified di- and tri-acrylates | 0 | 0 | 0 | 0 | 0 | 0 | 25 |
| | 2-[5-ethyl-5-[(acryloyloxy)methyl]-1,3-dioxane-2-yl]-2,2-dimethylethyl acrylate | 0 | 0 | 0 | 0 | 0 | 0 | 0 |
| | Dimethylol-tricyclodecane diacrylate | 0 | 0 | 0 | 0 | 0 | 0 | 0 |
| | Pentaerythritol triacrylate toluene diisocyanate urethane prepolymer | 0 | 0 | 0 | 0 | 0 | 0 | 0 |
| | Pentaerythritol triacrylate hexamethylene diisocyanate urethane prepolymer | 0 | 0 | 0 | 0 | 0 | 0 | 0 |
| Component (D) (d1) | DICY15 | 4.4 | 0 | 0 | 4.4 | 4.4 | 0 | 4.4 |
| | 1400F | 0 | 4.4 | 3.8 | 0 | 0 | 4.4 | 0 |
| | DCMU-99 | 3 | 3 | 3 | 3 | 3 | 0 | 3 |
| | Omicure94 | 0 | 0 | 0 | 0 | 0 | 2 | 0 |
| (d2) | Di-t-hexyl peroxide | 1.4 | 0.8 | 0.8 | 0.8 | 0.8 | 0.8 | 0.8 |
| Component (E) | VINYLEC E | 0 | 0 | 0 | 3 | 5 | 0 | 0 |
| Physical Properties of Resin Plate | | | | | | | | |
| | Flexural Strength [MPa] | 174 | 180 | 179 | 172 | 169 | 170 | 178 |
| | Flexural Modulus [GPa] | 3.80 | 4.23 | 4.17 | 4.12 | 4.02 | 3.81 | 4.07 |
| | Elongation at Break [%] | 9.1 | 10.2 | 9.2 | 10.8 | 11.98 | 13.0 | 12.5 |

| | | Example | | | | Comparative Example |
|---|---|---|---|---|---|---|
| Composition (part by mass) | | 21 | 22 | 23 | 24 | 1 |
| Component (A) | jER1007 | 0 | 0 | 0 | 0 | 50 |
| | jER4007P | 50 | 50 | 50 | 50 | 0 |
| Component (B) | jER828 | 0 | 0 | 0 | 0 | 50 |
| | jER807 | 50 | 50 | 50 | 50 | 0 |

TABLE 2-continued

| Component (C) | | | | | | |
|---|---|---|---|---|---|---|
| | Neopentyl glycol diacrylate | 0 | 0 | 0 | 0 | 0 |
| | Polyethylene glycol # 200 dimethacrylate | 0 | 0 | 0 | 0 | 0 |
| | Trimethylolpropane triacrylate | 0 | 0 | 0 | 0 | 0 |
| | Trimethylolpropane trimethacrylate | 0 | 0 | 0 | 0 | 0 |
| | Pentaerythritol tetraacrylate | 0 | 0 | 0 | 0 | 0 |
| | Dipentaerythritol hexaacrylate | 0 | 0 | 0 | 0 | 0 |
| | Isocyanuric acid EO-modified di- and tri-acrylates | 0 | 0 | 0 | 0 | 0 |
| | 2-[5-ethyl-5-[(acryloyloxy)methyl]-1,3-dioxane-2-yl]-2,2-dimethylethyl acrylate | 25 | 0 | 0 | 0 | 0 |
| | Dimethylol-tricyclodecane diacrylate | 0 | 25 | 0 | 0 | 0 |
| | Pentaerythritol triacrylate toluene diisocyanate urethane prepolymer | 0 | 0 | 25 | 0 | 0 |
| | Pentaerythritol triacrylate hexamethylene diisocyanate urethane prepolymer | 0 | 0 | 0 | 25 | 0 |
| Component (D) (d1) | DICY15 | 4.4 | 4.4 | 4.4 | 4.4 | 4 |
| | 1400F | 0 | 0 | 0 | 0 | 0 |
| | DCMU-99 | 3 | 3 | 3 | 3 | 3 |
| | Omicure94 | 0 | 0 | 0 | 0 | 0 |
| (d2) | Di-t-hexyl peroxide | 0.8 | 0.8 | 0.8 | 0.8 | 0 |
| Component (E) | VINYLEC E | 0 | 0 | 0 | 0 | 0 |
| Physical Properties of Resin Plate | | | | | | |
| | Flexural Strength [MPa] | 169 | 166 | 173 | 173 | 142 |
| | Flexural Modulus [GPa] | 4.0 | 3.94 | 4.02 | 3.96 | 3.15 |
| | Elongation at Break [%] | 12.6 | 13.9 | 10.6 | 9.7 | 10.3 |

As shown in Tables 1 and 2, each of the Example was superior to Comparative Example 1 without the component (C) in that the resin plate was excellent in strength and elastic modulus, while maintaining toughness. Moreover, the physical properties of the fiber-reinforced plastic plate and the fiber-reinforced plastic tube were improved in each of the Examples as compared to Comparative Example 1 without the component (C).

Example 25

Using jER4007P as the component (A), jER807 as the component (B), neopentyl glycol diacrylate as the component (C), DICY15 and DCMU-99 as the component (d1), di-t-hexyl peroxide as the component (d2), and TSR-400 as the component (E), a curable resin composition was prepared as follows.

First, according to the compositional ratio described in Table 1, the component (B) (liquid) and the component (d1) (solid) were weighed into a container such that the mass ratio of solid component to liquid component became 1:1, followed by addition of a masterbatch containing the component (D). The resulting was stirred to mix the components. The resulting was further finely mixed with a three-roll mill to obtain a curing agent-containing masterbatch.

Subsequently, from the components described in Table 1, the component (A), the component (B) other than used in the curing agent-containing masterbatch and the component (H) were weighed into a flask, heated to 140° C. using an oil bath, and allowed to be dissolved and mixed. After cooling to about 65° C., the component (C), the curing agent-containing master batch, and the component (d2) were added and stirred to obtain an uncured curable resin composition.

The various measurements and evaluations were performed with respect to the resin plate, prepreg and fiber-reinforced plastic produced using the obtained uncured curable resin composition. The results are shown in Table 3.

Examples 26 to 52, Comparative Examples 2 and 3

Curable resin compositions were prepared in the same manner as in Example 25 except that the compositional ratios were changed to those shown in Tables 1 and 2, and resin plates, prepregs, fiber-reinforced plastic plates, fiber-reinforced plastic tubes were produced, on which various measurements and evaluations were performed. The evaluation results are shown in Table 3 and Table 4. (In Tables 3 and 4, each of the amounts of the component (A), the component (B) and the component (H) is an amount (parts by mass) with respect to 100 parts by mass of total of all epoxy resins, the amount of the component (d2) is an amount (part by mass) with respect to 100 parts by mass of total of all epoxy resins and all (meth)acrylate compounds contained in the curable resin composition, and the amount of other components is an amount (part by mass) with respect to 100 parts by mass of total of all epoxy resins.)

TABLE 3

| | | Example | | | | | | | |
|---|---|---|---|---|---|---|---|---|---|
| Composition (part by mass) | | 25 | 26 | 27 | 28 | 29 | 30 | 31 | 32 |
| Component (A) | jER4007P | 20 | 20 | 20 | 20 | 20 | 20 | 20 | 20 |
| Component (B) | jER807 | 50 | 50 | 50 | 50 | 50 | 50 | 50 | 50 |
| Component (H) | TSR-400 | 30 | 30 | 30 | 30 | 30 | 30 | 30 | 30 |
| | LSA3301 | 0 | 0 | 0 | 0 | 0 | 0 | 0 | 0 |
| Component (C) | Neopentyl glycol diacrylate | 25 | 0 | 0 | 0 | 0 | 0 | 0 | 0 |
| | Trimethylolpropane triacrylate | 0 | 25 | 0 | 0 | 0 | 0 | 0 | 0 |
| | Pentaerythritol tetraacrylate | 0 | 0 | 25 | 0 | 0 | 0 | 0 | 0 |
| | Dipentaerythritol hexaacrylate | 0 | 0 | 0 | 25 | 0 | 0 | 0 | 0 |

TABLE 3-continued

| | | | | | | | | | |
|---|---|---|---|---|---|---|---|---|---|
| | Dioxane glycol diacrylate | 0 | 0 | 0 | 0 | 25 | 0 | 0 | 0 |
| | Dimethylol-tricyclodecane diacrylate | 0 | 0 | 0 | 0 | 0 | 25 | 0 | 0 |
| | Pentaerythritol triacrylate toluene diisocyanate urethane prepolymer | 0 | 0 | 0 | 0 | 0 | 0 | 25 | 0 |
| | Pentaerythritol triacrylate hexamethylene diisocyanate urethane prepolymer | 0 | 0 | 0 | 0 | 0 | 0 | 0 | 25 |
| Component (D) (d1) | 1400F | 5.4 | 5.4 | 5.4 | 5.4 | 5.4 | 5.4 | 5.4 | 5.4 |
| | DCMU-99 | 3.7 | 3.7 | 3.7 | 3.7 | 3.7 | 3.7 | 3.7 | 3.7 |
| | Omicure94 | 0 | 0 | 0 | 0 | 0 | 0 | 0 | 0 |
| | U-CAT 3513N | 0 | 0 | 0 | 0 | 0 | 0 | 0 | 0 |
| (d2) | Di-t-hexyl peroxide | 0.8 | 0.8 | 0.8 | 0.8 | 0.8 | 0.8 | 0.8 | 0.8 |
| Component (E) | VINYLEC E | 0 | 0 | 0 | 0 | 0 | 0 | 0 | 0 |
| Flexural Properties of Resin Plate | Flexural Strength [MPa] | 174 | 171 | 182 | 187 | 175 | 179 | 184 | 182 |
| | Flexural Modulus [GPa] | 3.8 | 3.7 | 3.9 | 4.0 | 3.9 | 4.0 | 4.0 | 3.9 |
| | Elongation at Break [%] | 9 | 9 | 9 | 11 | 12 | 11 | 8 | 8 |
| Fiber-Reinforced Plastic Tube | TR Strength [MPa] | — | — | — | — | — | — | — | — |
| | Flexural Modulus [GPa] | — | — | — | — | — | — | — | — |
| | Fracture Strain [%] | — | — | — | — | — | — | — | — |
| | MR Strength [MPa] | — | — | — | — | — | — | — | — |
| | Flexural Modulus [GPa] | — | — | — | — | — | — | — | — |
| | Fracture Strain [%] | — | — | — | — | — | — | — | — |

| | | Example | | | | | | |
|---|---|---|---|---|---|---|---|---|
| Composition (part by mass) | | 33 | 34 | 35 | 36 | 37 | 38 | 39 |
| Component (A) | jER4007P | 20 | 20 | 30 | 50 | 50 | 50 | 20 |
| Component (B) | jER807 | 50 | 50 | 60 | 40 | 40 | 40 | 60 |
| Component (H) | TSR-400 | 30 | 30 | 10 | 10 | 10 | 10 | 20 |
| | LSA3301 | 0 | 0 | 0 | 0 | 0 | 0 | 0 |
| Component (C) | Neopentyl glycol diacrylate | 0 | 0 | 0 | 0 | 0 | 0 | 0 |
| | Trimethylolpropane triacrylate | 0 | 0 | 0 | 0 | 0 | 0 | 0 |
| | Pentaerythritol tetraacrylate | 0 | 0 | 0 | 0 | 0 | 0 | 0 |
| | Dipentaerythritol hexaacrylate | 25 | 25 | 25 | 25 | 25 | 25 | 25 |
| | Dioxane glycol diacrylate | 0 | 0 | 0 | 0 | 0 | 0 | 0 |
| | Dimethylol-tricyclodecane diacrylate | 0 | 0 | 0 | 0 | 0 | 0 | 0 |
| | Pentaerythritol triacrylate toluene diisocyanate urethane prepolymer | 0 | 0 | 0 | 0 | 0 | 0 | 0 |
| | Pentaerythritol triacrylate hexamethylene diisocyanate urethane prepolymer | 0 | 0 | 0 | 0 | 0 | 0 | 0 |
| Component (D) (d1) | 1400F | 5.4 | 5.4 | 5.5 | 4 | 4 | 4 | 5.8 |
| | DCMU-99 | 0 | 0 | 3.7 | 2.7 | 2.7 | 2.7 | 3.9 |
| | Omicure94 | 2.6 | 0 | 0 | 0 | 0 | 0 | 0 |
| | U-CAT 3513N | 0 | 2.4 | 0 | 0 | 0 | 0 | 0 |
| (d2) | Di-t-hexyl peroxide | 0.8 | 0.8 | 0.8 | 0.4 | 0.8 | 2 | 0.8 |
| Component (E) | VINYLEC E | 0 | 0 | 0 | 0 | 0 | 0 | 0 |
| Flexural Properties of Resin Plate | Flexural Strength [MPa] | 190 | 185 | 186 | 172 | 180 | 177 | 187 |
| | Flexural Modulus [GPa] | 4.0 | 3.9 | 4.2 | 4.0 | 4.1 | 4.1 | 4.1 |
| | Elongation at Break [%] | 8 | 9 | 9 | 9 | 9 | 8 | 8 |
| Fiber-Reinforced Plastic Tube | TR Strength [MPa] | — | — | — | — | 1835 | — | — |
| | Flexural Modulus [GPa] | — | — | — | — | 68 | — | — |
| | Fracture Strain [%] | — | — | — | — | 11 | — | — |
| | MR Strength [MPa] | — | — | — | — | 2063 | — | — |
| | Flexural Modulus [GPa] | — | — | — | — | 90 | — | — |
| | Fracture Strain [%] | — | — | — | — | 9 | — | — |

TABLE 4

| | | Example | | | | | | | |
|---|---|---|---|---|---|---|---|---|---|
| Composition (part by mass) | | 40 | 41 | 42 | 43 | 44 | 45 | 46 | 47 |
| Component (A) | jER4007P | 40 | 30 | 10 | 30 | 30 | 30 | 30 | 30 |
| Component (B) | jER807 | 40 | 40 | 60 | 40 | 40 | 40 | 40 | 40 |
| Component (H) | TSR-400 | 20 | 30 | 30 | 30 | 30 | 30 | 30 | 0 |
| | LSA3301 | 0 | 0 | 0 | 0 | 0 | 0 | 0 | 30 |
| Component (C) | Neopentyl glycol diacrylate | 0 | 0 | 0 | 0 | 0 | 0 | 0 | 0 |
| | Trimethylolpropane triacrylate | 0 | 0 | 0 | 0 | 0 | 0 | 0 | 0 |
| | Pentaerythritol tetraacrylate | 0 | 0 | 0 | 0 | 0 | 0 | 0 | 0 |
| | Dipentaerythritol hexaacrylate | 25 | 25 | 25 | 25 | 25 | 25 | 25 | 25 |
| | Dioxane glycol diacrylate | 0 | 0 | 0 | 0 | 0 | 0 | 0 | 0 |
| | Dimethylol-tricyclodecane diacrylate | 0 | 0 | 0 | 0 | 0 | 0 | 0 | 0 |
| | Pentaerythritol triacrylate toluene diisocyanate urethane prepolymer | 0 | 0 | 0 | 0 | 0 | 0 | 0 | 0 |
| | Pentaerythritol triacrylate hexamethylene diisocyanate urethane prepolymer | 0 | 0 | 0 | 0 | 0 | 0 | 0 | 0 |

TABLE 4-continued

| | | | | | | | | | | |
|---|---|---|---|---|---|---|---|---|---|---|
| Component (D) | (d1) | 1400F | 4.3 | 4.7 | 6.2 | 4.7 | 4.7 | 4.7 | 4.7 | 4.5 |
| | | DCMU-99 | 2.9 | 3.2 | 4.2 | 3.2 | 3.2 | 3.2 | 3.2 | 2.9 |
| | | Omicure94 | 0 | 0 | 0 | 0 | 0 | 0 | 0 | 0 |
| | | U-CAT 3513N | 0 | 0 | 0 | 0 | 0 | 0 | 0 | 0 |
| | (d2) | Di-t-hexyl peroxide | 0.8 | 0.4 | 0.8 | 2 | 0.8 | 0.8 | 0.8 | 0.8 |
| Component (E) | | VINYLEC E | 0 | 0 | 0 | 0 | 0 | 1 | 3 | 1 |
| Flexural Properties | | Flexural Strength [MPa] | 179 | 176 | 186 | 181 | 186 | 180 | 179 | 182 |
| of Resin Plate | | Flexural Modulus [GPa] | 4.0 | 3.9 | 3.9 | 4.0 | 4.0 | 3.9 | 3.9 | 4.0 |
| | | Elongation at Break [%] | 10 | 8 | 9 | 8 | 12 | 8 | 9 | 8 |
| Fiber- | TR | Strength [MPa] | — | — | — | — | 2051 | — | — | — |
| Reinforced | | Flexural Modulus [GPa] | — | — | — | — | 71 | — | — | — |
| Plastic Tube | | Fracture Strain [%] | — | — | — | — | 11 | — | — | — |
| | MR | Strength [MPa] | — | — | — | — | 2081 | — | — | — |
| | | Flexural Modulus [GPa] | — | — | — | — | 91 | — | — | — |
| | | Fracture Strain [%] | — | — | — | — | 9 | — | — | — |

| | | | Example | | | | | Comp. Ex. | |
|---|---|---|---|---|---|---|---|---|---|
| Composition (part by mass) | | | 48 | 49 | 50 | 51 | 52 | 2 | 3 |
| Component (A) | | jER4007P | 40 | 10 | 30 | 10 | 30 | 50 | 30 |
| Component (B) | | jER807 | 30 | 50 | 30 | 40 | 20 | 40 | 40 |
| Component (H) | | TSR-400 | 30 | 40 | 40 | 50 | 50 | 10 | 30 |
| | | LSA3301 | 0 | 0 | 0 | 0 | 0 | 0 | 0 |
| Component (C) | | Neopentyl glycol diacrylate | 0 | 0 | 0 | 0 | 0 | 0 | 0 |
| | | Trimethylolpropane triacrylate | 0 | 0 | 0 | 0 | 0 | 0 | 0 |
| | | Pentaerythritol tetraacrylate | 0 | 0 | 0 | 0 | 0 | 0 | 0 |
| | | Dipentaerythritol hexaacrylate | 25 | 25 | 25 | 25 | 25 | 0 | 0 |
| | | Dioxane glycol diacrylate | 0 | 0 | 0 | 0 | 0 | 0 | 0 |
| | | Dimethylol-tricyclodecane diacrylate | 0 | 0 | 0 | 0 | 0 | 0 | 0 |
| | | Pentaerythritol triacrylate toluene diisocyanate urethane prepolymer | 0 | 0 | 0 | 0 | 0 | 0 | 0 |
| | | Pentaerythritol triacrylate hexamethylene diisocyanate urethane prepolymer | 0 | 0 | 0 | 0 | 0 | 0 | 0 |
| Component (D) | (d1) | 1400F | 3.9 | 5.8 | 4.3 | 5.4 | 3.9 | 4 | 4.7 |
| | | DCMU-99 | 2.7 | 3.9 | 2.9 | 3.6 | 2.6 | 2.7 | 3.2 |
| | | Omicure94 | 0 | 0 | 0 | 0 | 0 | 0 | 0 |
| | | U-CAT 3513N | 0 | 0 | 0 | 0 | 0 | 0 | 0 |
| | (d2) | Di-t-hexyl peroxide | 0.8 | 0.8 | 0.8 | 0.8 | 0.8 | 0 | 0 |
| Component (E) | | VINYLEC E | 0 | 0 | 0 | 0 | 0 | 0 | 0 |
| Flexural Properties | | Flexural Strength [MPa] | 178 | 185 | 180 | 182 | 181 | 155 | 160 |
| of Resin Plate | | Flexural Modulus [GPa] | 4.1 | 4.1 | 3.9 | 3.9 | 3.9 | 3.8 | 3.8 |
| | | Elongation at Break [%] | 9 | 8 | 9 | 8 | 8 | 14 | 14 |
| Fiber- | TR | Strength [MPa] | — | — | — | — | — | 1830 | 1883 |
| Reinforced | | Flexural Modulus [GPa] | — | — | — | — | — | 63 | 68 |
| Plastic Tube | | Fracture Strain [%] | — | — | — | — | — | 11 | 11 |
| | MR | Strength [MPa] | — | — | — | — | — | 1813 | 2080 |
| | | Flexural Modulus [GPa] | — | — | — | — | — | 82 | 89 |
| | | Fracture Strain [%] | — | — | — | — | — | 8 | 9 |

As shown in Tables 3 and 4, each of the Example was superior to Comparative Examples 1 and 2 without the component (C) in that the resin plate was excellent in strength and elastic modulus, while maintaining toughness. Moreover, the physical properties of the fiber-reinforced plastic tube were improved in each of the Examples as compared to Comparative Example 1 without the component (C).

Examples 53 to 57, Comparative Examples 4 to 6

Curable resin compositions were prepared in the same manner as in Example 1 except that the compositional ratios were changed to those shown in Table 5, and resin plates, prepregs, fiber-reinforced plastic plates, fiber-reinforced plastic tubes were produced, on which various measurements and evaluations were performed. The evaluation results are shown in Table 5.

TABLE 5

| Composition (part by mass) | | Ex. 53 | Ex. 54 | Ex. 55 | Ex. 56 | Ex. 57 | Ex. 58 | Ex. 59 | Comp. Ex. 4 | Comp. Ex. 5 | Comp. Ex. 6 |
|---|---|---|---|---|---|---|---|---|---|---|---|
| Component(A) | jER4004P | 50 | 0 | 0 | 0 | 0 | 0 | 0 | 0 | 0 | 0 |
| | jER4007P | 0 | 50 | 50 | 50 | 50 | 22 | 22 | 0 | 0 | 0 |
| Epoxy resin other than Component(A) | jER1001 | 0 | 0 | 0 | 0 | 0 | 0 | 0 | 50 | 50 | 0 |
| | jER1002 | 0 | 0 | 0 | 0 | 0 | 0 | 0 | 0 | 0 | 50 |
| Component(B) | jER828 | 0 | 0 | 0 | 0 | 0 | 0 | 0 | 50 | 50 | 50 |
| | jER807 | 50 | 50 | 50 | 50 | 50 | 28 | 28 | 0 | 0 | 0 |
| Component(H) | TSR-400 | 0 | 0 | 0 | 0 | 0 | 50 | 50 | 0 | 0 | 0 |
| Component(C) | Dipentaerythritol hexaacrylate | 25 | 25 | 25 | 25 | 25 | 25 | 25 | 0 | 25 | 25 |

TABLE 5-continued

| Composition (part by mass) | | Ex. 53 | Ex. 54 | Ex. 55 | Ex. 56 | Ex. 57 | Ex. 58 | Ex. 59 | Comp. Ex. 4 | Comp. Ex. 5 | Comp. Ex. 6 |
|---|---|---|---|---|---|---|---|---|---|---|---|
| Component (D) (d1) | 1400F | 4.8 | 4.4 | 4.4 | 2.7 | 5.3 | 4.5 | 4.5 | 5.2 | 5.2 | 4.8 |
| | DCMU-99 | 3.2 | 0 | 1 | 3 | 3 | 2.9 | 2.9 | 3.5 | 3.5 | 3.2 |
| | Omicure24 | 0 | 1.7 | 0 | 0 | 0 | 0 | 0 | 0 | 0 | 0 |
| (d2) | Di-t-hexyl peroxide | 0.8 | 0.8 | 0.8 | 0.8 | 0.8 | 0 | 0 | 0 | 0.8 | 0.8 |
| | Dicumyl peroxide | 0 | 0 | 0 | 0 | 0 | 0.4 | 0.8 | 0 | 0 | 0 |
| Component(E) | VINYLEC E | 0 | 0 | 0 | 0 | 0 | 3 | 3 | 0 | 0 | 0 |
| Flexural Properties of Resin Plate | Flexural Strength [MPa] | 173 | 178 | 177 | 170 | 174 | 182 | 185 | 150 | 166 | 160 |
| | Flexural Modulus [GPa] | 3.9 | 3.8 | 3.9 | 3.7 | 3.7 | 3.8 | 4 | 3.3 | 3.3 | 3.5 |
| | Elongation at Break [%] | 10 | 7 | 7 | 9 | 8 | 8 | 9 | 14 | 9 | 14 |

INDUSTRIAL APPLICABILITY

The use of the curable resin composition of the present invention enables production of an excellent fiber-reinforced plastic tube. Therefore, the present invention can provide wide variety of fiber-reinforced plastic molded articles with excellent mechanical properties, ranging from, for example, molded articles for sports and leisure applications such as golf club shafts, to molded articles for industrial applications such as aircrafts.

The invention claimed is:

1. A prepreg comprising reinforcing fibers and a matrix resin, wherein:
   the reinforcing fibers are impregnated with the matrix resin,
   the prepreg is in the form of a sheet, and
   the matrix resin is a heat-curable resin composition comprising components (A), (B), (C) and (D) below:
   component (A): a bisphenol epoxy resin with a softening point of 80° C. or more,
   component (B): a bisphenol epoxy resin which is liquid at 25° C.,
   component (C): a bi- or more-functional (meth)acrylate monomer, and
   component (D): a curing agent comprising at least one component (d1) selected from the group consisting of a dicyandiamide, a urea, and an imidazole, and at least one component (d2) which is a radical polymerization initiator.

2. The prepreg according to claim 1, which further comprises component (H): an oxazolidone ring-containing epoxy resin.

3. The prepreg according to claim 1, wherein the component (d1) is contained in an amount of 1 to 15 parts by mass with respect to 100 parts by mass of a total of all epoxy resins contained in the heat-curable resin composition.

4. The prepreg according to claim 1, wherein the component (d1) is the dicyandiamide.

5. The prepreg according to claim 1, wherein the component (d1) is the urea.

6. The prepreg according to claim 1, wherein the component (d1) is the imidazole.

7. The prepreg according to claim 1, wherein the component (d2) is contained in an amount of 0.1 to 5 parts by mass with respect to 100 parts by mass of a total of all epoxy resins and all (meth)acrylate monomers contained in the heat-curable resin composition.

8. The prepreg according to claim 1, wherein the component (A) is contained in an amount of 20 parts by mass or more and 80 parts by mass or less with respect to 100 parts by mass of a total of all epoxy resins contained in the heat-curable resin composition.

9. The prepreg according to claim 1, wherein the component (B) is contained in an amount of 20 parts by mass or more and 80 parts by mass or less with respect to 100 parts by mass of a total of all epoxy resins contained in the heat-curable resin composition.

10. The prepreg according to claim 1, wherein the component (C) is contained in an amount of 5 to 45 parts by mass with respect to 100 parts by mass of a total of all epoxy resins contained in the heat-curable resin composition.

11. The prepreg according to claim 1, which further comprises component (E): a thermoplastic resin.

12. The prepreg according to claim 11, wherein the component (E) is contained in an amount of 1 part by mass or more and 15 parts by mass or less with respect to 100 parts by mass of a total of all epoxy resins contained in the heat-curable resin composition.

13. The prepreg according to claim 1, wherein no tri- or more-functional epoxy resins are present in the heat-curable resin composition.

14. The prepreg according to claim 1, wherein the reinforcing fibers comprise a carbon fiber.

* * * * *